(12) United States Patent
Maeta et al.

(10) Patent No.: US 7,427,322 B2
(45) Date of Patent: *Sep. 23, 2008

(54) ORGANIC PIGMENT FINE-PARTICLE, AND METHOD OF PRODUCING THE SAME

(75) Inventors: Hideki Maeta, Minami-ashigara (JP); Yuki Shimizu, Minami-ashigara (JP); Tadahisa Sato, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/889,446

(22) Filed: Aug. 13, 2007

(65) Prior Publication Data

US 2007/0289500 A1 Dec. 20, 2007

Related U.S. Application Data

(60) Continuation of application No. 11/493,667, filed on Jul. 27, 2006, now abandoned, which is a division of application No. 10/944,893, filed on Sep. 21, 2004, now Pat. No. 7,160,380.

(30) Foreign Application Priority Data

Sep. 22, 2003 (JP) ............................. 2003-330587
Sep. 22, 2003 (JP) ............................. 2003-330726
Mar. 24, 2004 (JP) ............................. 2004-087269

(51) Int. Cl.
*C09B 67/10* (2006.01)
*C09B 67/00* (2006.01)
*C09B 67/12* (2006.01)
*C09B 67/20* (2006.01)
*C09B 67/48* (2006.01)
*C09B 67/50* (2006.01)
*C09B 67/52* (2006.01)
*C09B 48/00* (2006.01)

(52) U.S. Cl. ....................... 106/493; 106/412; 106/413; 106/494; 106/495; 106/496; 106/497; 106/498

(58) Field of Classification Search ................. 106/412, 106/413, 493, 494, 495, 496, 497, 498
See application file for complete search history.

(56) References Cited

U.S. PATENT DOCUMENTS

| 4,632,704 | A | 12/1986 | Bäbler | |
|---|---|---|---|---|
| 5,110,931 | A | 5/1992 | Dietz et al. | |
| 5,368,641 | A | 11/1994 | Dietz et al. | |
| 6,469,147 | B2 | 10/2002 | Nickel et al. | |
| 6,537,364 | B2 | 3/2003 | Dietz et al. | |
| 6,548,647 | B2 | 4/2003 | Dietz et al. | |
| 7,160,380 | B2 * | 1/2007 | Maeta et al. | ................ 106/493 |
| 2001/0029294 | A1 | 10/2001 | Nickel et al. | |
| 2002/0055619 | A1 | 5/2002 | Dietz et al. | |

FOREIGN PATENT DOCUMENTS

| EP | 0842987 | A2 | 5/1988 |
|---|---|---|---|
| EP | 1195413 | A1 | 4/2002 |
| EP | 1195415 | A1 | 4/2002 |
| JP | 2002-030230 | A | 1/2002 |
| JP | 2002-038043 | A | 2/2002 |
| JP | 2002-138216 | A | 5/2002 |
| JP | 2002-155221 | A | 5/2002 |
| JP | 2002-540930 | A | 12/2002 |
| JP | 2003-026972 | A | 1/2003 |
| JP | 2003-524033 | A | 8/2003 |
| WO | 00/61275 | A2 | 10/2000 |
| WO | 2004/037929 | A1 | 5/2004 |

OTHER PUBLICATIONS

Patent Abstracts of Japan, vol. 2003, No. 11, Nov. 5, 2003, JP 2003-210963 A.

Bernd Penth, "*New Non-Clogging Microreactor for Chemical Processing and Nano Materials*", Proceedings. Micro. Tec. VDE World Microtechnologies Congress, Proceedings of International Conference of Microtechnologies, XX, XX, vol. 1, 2000, pp. 401-405, XP001058349, Germany, no month.

* cited by examiner

*Primary Examiner*—Anthony J Green
(74) *Attorney, Agent, or Firm*—Buchanan Ingersoll & Rooney PC

(57) ABSTRACT

A method of producing a dispersion of a pigment, comprising: bringing a solution in which an organic pigment is dissolved, and an aqueous medium, into contact with each other in a channel having an equivalent diameter of 1 mm or less, thereby making the pigment into a fine particle thereof, wherein at least one of the solution and the aqueous medium comprises at least one anionic dispersing agent.

11 Claims, 4 Drawing Sheets

ORGANIC PIGMENT FINE-PARTICLE, AND METHOD OF PRODUCING THE SAME

CROSS-REFERENCE TO RELATED APPLICATIONS

This application is a continuation of Application No. 11/493,667, filed Jul. 27, 2006, now abandoned, which is a divisional of Application No. 10/944,893, filed Sep. 21, 2004, now U.S. Pat. No. 7,160,380, the contents of which are herein incorporated by reference, which in turn claims the benefit of foreign priority of Japanese Application Nos. 2003-330726, 2003-330587, and 2004-087269, filed Sep. 22, 2003, Sep. 22, 2003, and Mar. 24, 2004, respectively.

FIELD OF THE INVENTION

The present invention relates to a method of producing fine-particles of an organic pigment. More specifically, the invention relates to a method of producing organic pigment fine-particles, by changing the hydrogen ion exponent (pH) of a solution of an organic pigment, which solution flows in a state of laminar flow in a channel (flow path). Further, the present invention relates to an organic pigment obtained by the method; and a dispersion containing the same.

BACKGROUND OF THE INVENTION

Pigments generally exhibit visit color tone and high coloring power, and they are widely used in many fields. Examples of use applications in which pigments are used include paints, printing inks, electrophotographic toners, ink-jet inks, and color filters. Pigments are important compounds indispensable in everyday life at the present time. General properties, classification by use, and other aspects of pigments are described in, for example, "Dispersion Stabilization of Pigment and Surface Treatment Technique/Evaluation", Technical Information Institute Co., Ltd., 2001, pp. 123-224. In connection with the above-mentioned use applications, examples of pigments that must provide high performance, and that are of particular importance in practical use, are ink-jet ink pigments, and color filter pigments.

As the coloring material for ink-jet ink, dyes have been used, but they have drawbacks as to water resistance and light resistance. To overcome the drawbacks, pigments have come to be used. Images obtained from pigment inks have remarkable advantages of superior light resistance and water resistance compared with images obtained from dye-based inks. However, the former images have the problems that the pigment is not easily formed uniformly or pulverized into fine-particles of a nanometer size (i.e., monodispersion), which can permeate pores in the surface of paper, and then the pigment in the image are poor in close bindness to the paper.

With an increase in the number of pixels in digital cameras, there is a need for a color filter used in a CCD sensor to be made thinner. In the color filter, an organic pigment is used. Since the thickness of the filter depends largely on the particle diameter of the organic pigment, there has been a need to produce monodisperse and stable fine-particles of a nanometer-size level.

In general, the methods to produce fine particles are roughly classified into the breakdown method, in which fine particles are produced from a bulk material by pulverization or the like, and the build-up method, in which fine particles are produced by particle-growth from a gas phase or liquid phase, as described, for example, in "Experimental Chemical Lecture, $4^{th}$ Edition," edited by the Chemical Society of Japan (Maruzen Co., Ltd.), vol. 12, pp. 411-488. The pulverizing method, which has been widely used hitherto, is a fine-particle-producing method having high practicability, but it has various problems, such as that its productivity is very low in producing organic material particles of nanometer size, and that the materials to which the method can be applied are limited. In recent years, investigations have been made to produce organic material fine-particles of nanometer size by the build-up method.

One of the methods recently disclosed is to use a supercritical fluid or subcritical fluid to make azo pigments, which are organic pigments, into fine particles (for example, JP-A-2002-138216 ("JP-A" means unexamined published Japanese patent application)). That is, this method is one dissolving the pigment into a supercritical fluid or subcritical fluid, and then returning the solution to a condition of ambient temperature and normal pressure, to grow crystals, thereby producing fine particles. Performance of this method causes such problems: First, it requires an apparatus that can realize very high temperature and pressure, close to supercritical temperature and pressure; and second, the organic compounds generally decompose easily under such conditions.

A second method of the above-mentioned methods uses a microjet reactor: a micro-chemical process technique that will be described later, to produce fine particles (for example, JP-A-2002-146222, 2002-155221, and 2002-161218). This is a method of introducing a solution, in which a pigment is dissolved, and a precipitation medium solution, into two nozzles that are opposite to each other and that have different micrometer sizes, at high pressure (for example, 5 MPa) by means of a pump; and introducing a gas (such as compressed air) perpendicularly into a portion where the jet flows of the two solutions collide with each other, so as to discharge a suspension of the pigment by the gas flow (flow rate, about 0.5 $m^3/h$). The methods described in JP-A-2002-146222 and JP-A-2002-161218, which are examples of this method, correspond to a breakdown method in which pigment suspensions are caused to collide with each other in a chamber, thereby making the pigment particles finer. On the other hand, the method described in JP-A-2002-155221 is to spray a solution of a pigment and a precipitation medium into a chamber, to precipitate the pigment, thereby producing fine particles, which method can be regarded as a build-up method. This method adopts the following contrivance: Particles are generated in a very small space, of a micrometer scale, and the particles are immediately taken out from the apparatus, thereby preventing the apparatus from being blocked by the pigment fine-particles. Thus, this method is preferred to obtain fine particles having a narrow particle size distribution. However, the method has such problems as that the contact time for the two solutions is not easily controlled, and thus subtle reaction control is difficult.

A third method is to bring a solution, in which an organic pigment is dissolved, gradually into contact with an aqueous medium, to precipitate the pigment (a so-called co-precipitation method (re-precipitation method)), in which a dispersing agent is incorporated into either of the solutions, thereby producing stable, fine particles (JP-A-2003-26972). This method enables producing particles of a nanometer size easily. However, when the system is scaled up, the sizes of the particles are scattered, and needle particles are apt to generate. Therefore, even if the generated particles are observed as single-nanometer particles in a particle-measuring apparatus, observation of the particle shape thereof with a transmission electron microscope shows the particles to be considerably long needle particles. Thus, the particles are unsuitable for fine particles for ink-jet ink, which are preferably spherical.

A known method, positioned between the build-up method and the breakdown method, is a conditioning method, in which coarse particles are heat-treated to adjust the particle diameter thereof. In a method recently disclosed, an organic pigment is conditioned in a micro-reactor, using an idea of the micro-chemical process technique, which will be described later (JP-A-2002-30230). JP-A-2002-30230 describes that a suspension of a liquid pigment precursor (a suspension in which a pigment having a broad particle size distribution is suspended in a solution) is continuously introduced into a micro-reactor and heat-treated, thereby the pigment crystalline fine-particles in the suspension undergo phase-change; and at the same time to the phase-change, particles having an average particle size larger than that of the precursor, and having a narrow particle size distribution, can be produced. This method advantageously produces particles having a narrow particle size distribution, but it has the drawback that particles favorably having a small particle diameter, among the precursor particles, are also made larger.

In recent years, attention has been paid to a technique in which a reaction channel, having a microscopic channel sectional area, is used to conduct chemical reaction; that is, the so-called "micro-chemical process technique," since chemical reaction can be effectively conducted. The "micro-chemical process technique" is substance-producing technique and chemical analysis technique using a chemical and/or physical phenomenon that is caused in a micro-channel, which is formed on a solid substrate by micromachining technique and the like, and which has a width of several micrometers to several hundred micrometers.

A general method of producing a disazo condensed-type pigment is described, for example, by W. Herbst and K. Hunger, in "Industrial Organic Pigments, Production, Properties, Applications, —Second Completely Revised Edition," VCH A Wiley Company, 1997, pp. 595-630. On the other hand, as a method of producing a pigment in a micro-reactor based on a micro-chemical process technique, a method of producing a disazo condensed-type pigment or a diketopyrrolopyrrole-series pigment is disclosed in, for example, JP-A-2002-38043 and JP-A-2002-12788. These can be regarded as one type of a build-up method. In the description of JP-A-2002-38043, the step up to the synthesis of the disazo-type pigment is conducted in a micro-reactor. However, the starting compound itself has low solubility, and therefore the compound is introduced as a suspension, into the micro-reactor. This may be highly apt to cause blockage of the channel if conditions to be controlled are incorrect. Thus, it is unavoidable to say that there is difficulty from the viewpoints of reproducibility and continuous production.

SUMMARY OF THE INVENTION

The present invention resides in a method of producing a fine particle of an organic pigment, which comprises the steps of:

flowing a solution of an organic pigment dissolved in an alkaline or acidic aqueous medium, through a channel which provides a laminar flow; and changing a hydrogen ion exponent (pH) of the solution in the course of the laminar flow.

Further, the present invention resides in a fine particle of an organic pigment, which is obtained by the above producing method, and which has a mode diameter of 1 μm or less.

Further, the present invention resides in a method of producing a fine particle of an organic pigment, which comprises:

flowing a solution containing a reaction component, through an apparatus having a channel which provides a laminar flow.

Further, the present invention resides in a method of producing a dispersion of a pigment, which comprises:

bringing a solution in which an organic pigment is dissolved, and an aqueous medium, into contact with each other in an apparatus having a channel whose equivalent diameter is 1 mm or less, thereby making the pigment into a fine particle thereof, wherein at least one of the solution and the aqueous medium contains a dispersing agent.

Other and further features and advantages of the invention will appear more fully from the following description, taken in connection with the accompanying drawings.

BRIEF DESCRIPTION OF THE DRAWINGS

FIG. 1-2 is a sectional view taken on line I-I of FIG. 1-1.

FIG. 2-1 is an explanatory view of a reactor having a cylindrical tube-type channel in which a channel is provided to insert at one side thereof.

FIG. 2-2 is a sectional view taken on line IIa-IIa of FIG. 2-1.

FIG. 2-3 is a sectional view taken on line IIb-IIb of FIG. 2-1.

FIG. 3-1 is an explanatory view of a reactor having on both sides thereof Y-shaped channels.

FIG. 3-2 is a sectional view taken on line III-III of FIG. 3-1.

DETAILED DESCRIPTION OF THE INVENTION

Figure 1:
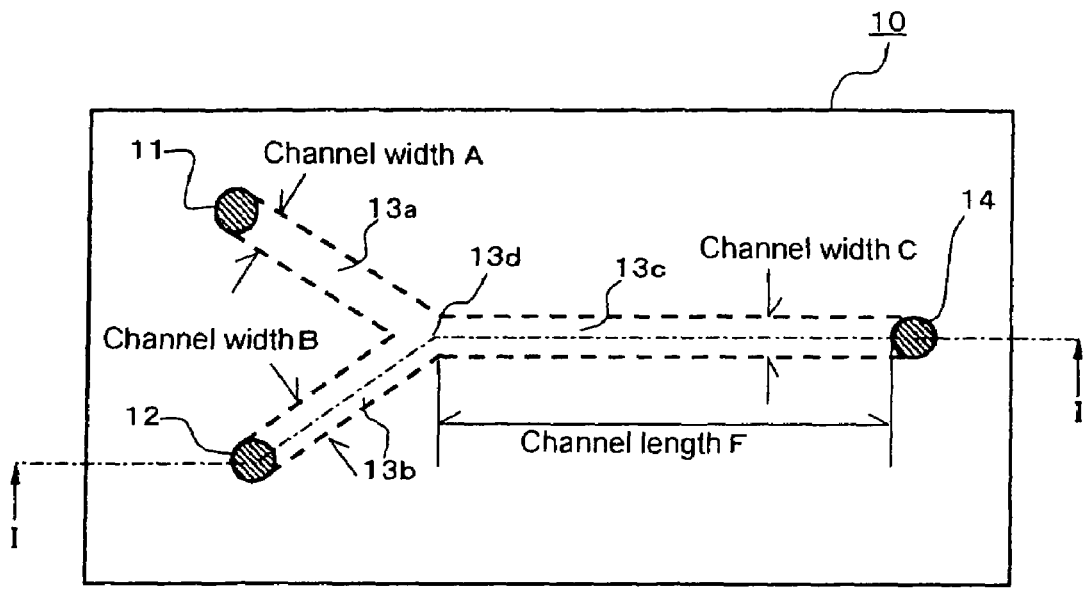
FIG. 1-1 is an explanatory view of a reactor having on one side thereof a Y-shaped channel.

According to the present invention, there is provided the following means:

(1) A method of producing a fine particle of an organic pigment, comprising the steps of:

flowing a solution of an organic pigment dissolved in an alkaline or acidic aqueous medium, through a channel which provides a laminar flow; and changing a hydrogen ion exponent (pH) of the solution in the course of the laminar flow;

(2) The producing method according to the above item (1), wherein the solution of the organic pigment is alkaline;

(3) The producing method according to the above item (1) or (2), wherein the solution of the organic pigment is a homogeneous solution in which the organic pigment is dissolved in a homogeneous mixed solvent of water and an organic solvent;

(4) The producing method according to any one of the above items (1) to (3), wherein an equivalent diameter of the channel is 10 mm or less;

(5) The producing method according to any one of the above items (1) to (4), wherein the solution of the organic pigment contains at least one dispersing agent;

(6) The producing method according to the above item (5), wherein at least one of the dispersing agents is a polymer dispersing agent;

(7) The producing method according to the above item (5), wherein at least one of the dispersing agents is an anionic dispersing agent;

(8) The producing method according to any one of the above items (5) to (7), wherein the at least one dispersing agent is at least one polymer dispersing agent and at least one anionic dispersing agent;

(9) The producing method according to any one of the above items (1) to (8), wherein the fine particle of the organic pigment is obtained as a dispersion thereof;

(10) The producing method according to any one of the above items (1) to (9), wherein an equivalent diameter of the channel is 1 mm or less;

(11) The producing method according to the above item (1), wherein the channel of the laminar flow is a micro-reaction site;

(12) A fine particle of an organic pigment, which is obtained by the producing method according to any one of the above items (1) to (11), and which has a mode diameter of 1 μm or less;

(13) A method of producing a fine particle of an organic pigment, comprising:

flowing at least one solution containing a reaction component, through an apparatus having a channel whose equivalent diameter is 1 mm or less;

(14) The producing method according to the above item (13), wherein the fine particle of the organic pigment is of a quinacridone-series pigment represented by formula (I):

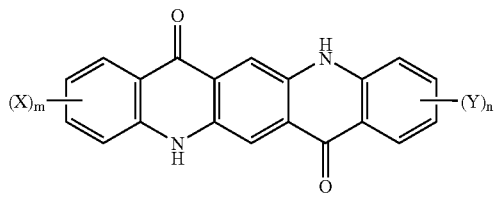

Formula (I)

wherein, in formula (I), X and Y each independently represent a fluorine atom, a chlorine atom, an alkyl group having 1 to 3 carbon atoms, an alkoxy group having 1 to 3 carbon atoms, or a group $COOR_a$, in which $R_a$ represents a hydrogen atom or an alkyl group having 1 to 10 carbon atoms; and m and n each independently are 0, 1 or 2;

(15) The producing method according to the above item (13), wherein the fine particle of the organic pigment is of a condensate of an aryl ester of an azocarboxylic acid and an aromatic diamine, or of a condensate of a diaryl ester of an azodicarboxylic acid and an aromatic amine;

(16) A method of producing a dispersion of a pigment, comprising:

bringing a solution in which an organic pigment is dissolved, and an aqueous medium, into contact with each other, preferably in an apparatus having a channel whose equivalent diameter is 1 mm or less, thereby making the pigment into a fine particle thereof, wherein at least one of the solution and the aqueous medium contains a dispersing agent;

(17) The producing method according to the above item (16), wherein at least one of the dispersing agent is a polymer dispersing agent;

(18) The producing method according to the above item (16), wherein at least one of the dispersing agent is an anionic dispersing agent;

(19) The producing method according to any one of the above items (16) to (18), wherein as the dispersing agent, at least one polymer dispersing agent and at least one anionic dispersing agent are contained; and

(20) The producing method according to any one of the above items (16) to (19), wherein the solution of the organic pigment is alkaline.

Further, examples of preferable embodiments of the present invention include the followings:

(21) The producing method according to any one of the above items (1) to (12) or (16) to (20), wherein water, or an aqueous solution in which at least one dispersing agent is dissolved, is introduced into the channel from an introducing port that is different from that for the solution of the organic pigment, to bring these two solutions into contact with each other in the channel, to change the hydrogen ion exponent (pH);

(22) The producing method according to any one of the above items (1) to (12) or (16) to (21), wherein a plurality of laminar flows are formed in the channel, and when the formed organic pigment fine particle is contained in one out of the laminar flows, the laminar flow containing the organic pigment fine particle is separated from the other laminar flow(s) at an outlet of the channel;

(23) The producing method according to any one of the above items (1) to (12) or (16) to (22), wherein the step of changing the hydrogen ion exponent (pH) is performed under conditions that is in the temperature range of 5 to 15° C., and that the temperature change is as small as possible;

(24) The producing method according to any one of the above items (1) to (12) or (16) to (23), wherein the organic pigment is a quinacridone-series pigment;

(25) The producing method according to any one of the above items (1) to (12) or (16) to (23), wherein the organic pigment is a diketopyrrolopyrrole-series pigment;

(26) The producing method according to any one of the above items (1) to (12) or (16) to (23), wherein the organic pigment is a disazo condensed-type pigment;

(27) The producing method according to any one of the above items (1) to (12) or (16) to (23), wherein the organic pigment is a phthalocyanine-series pigment;

(28) The producing method according to the above item (24), wherein the quinacridone-series pigment is represented by the above formula (I);

(29) The producing method according to the above item (14), wherein the quinacridone-series pigment represented by formula (I) is produced by an oxidization reaction of a 6,13-dihydroquinacridone compound represented by formula (II), or by a cyclization reaction of a diarylaminoterephthalic acid or an ester compound thereof represented by formula (III):

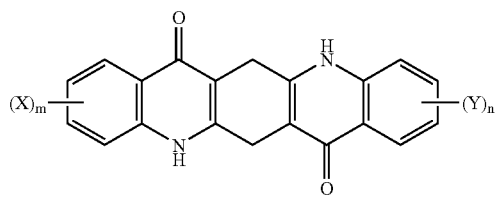

Formula (II)

wherein, in formula (II), X and Y each independently represent a fluorine atom, a chlorine atom, an alkyl group having 1 to 3 carbon atoms, an alkoxy group having 1 to 3 carbon atoms, or a group COOR$_a$, in which R$_a$ represents a hydrogen atom or an alkyl group having 1 to 10 carbon atoms; and m and n each independently are 0, 1 or 2; and

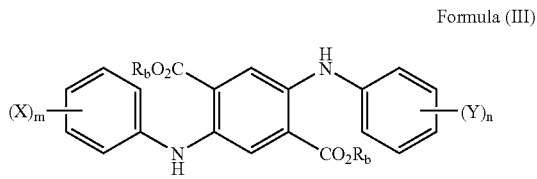

Formula (III)

wherein, in formula (III), X, Y, m, and n have the same meanings as those described above; and R$_b$ represents a hydrogen atom, an alkyl, alkenyl or alkynyl group having 1 to 10 carbon atoms, or an aryl group having 6 to 10 carbon atoms; and

(30) The producing method according to the above item (15), wherein the disazo condensed-type pigment is represented by formula (IV) or (V):

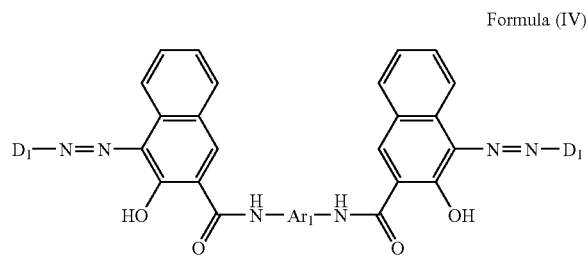

Formula (IV)

wherein, in formula (IV), Ar$_1$ represents a divalent aromatic group; and D$_1$ represents a substituent;

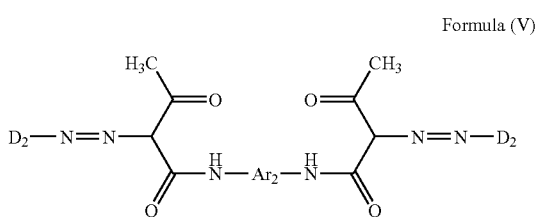

Formula (V)

wherein, in formula (V), Ar$_2$ represents a divalent aromatic group; and D$_2$ represents a substituent.

The inventors, having eagerly investigated to solve the above-mentioned problems in the conventional methods, have found out that, when a solution containing a reaction component is caused to flow into a channel, to synthesize a target organic pigment, the organic pigment, of high purity, can be rapidly obtained under a mild condition. Further, the inventors have found out that, by carrying out a co-precipitation method (re-precipitation method) to a solution of an organic pigment, under the effect of pH change, in a channel in which a laminar flow is preferential (predominant), organic pigment fine-particles having evener particle sizes can be obtained, compared with when a conventional method, as performed in a flask, is carried out. In addition, the inventors have found out that this method can be applied in selecting a synthetic intermediate, thereby the pigment fine-particle can be especially effectively produced, without blocking the channel. The present invention has been attained based on these findings.

The present invention is described in detail hereinafter. Herein, the expression "numerical value A to numerical value B", which expresses a range of a value of a physical property or characteristic, means that "the numerical value A or more and the numerical value B or less".

The apparatus (device) that can be used in the present invention is one having a channel capable of forming laminar flow, preferably an apparatus having a channel with an equivalent diameter of 10 mm or smaller, and more preferably an apparatus having a channel with an equivalent diameter of 1 mm or smaller. First, the equivalent diameter is described below.

The equivalent diameter in the present invention is a term also called a corresponding diameter, which is used in mechanical engineering field. If a cylindrical pipe equivalent to the pipe (channel in the present invention) having any sectional shape is assumed, the diameter of the equivalent cylindrical pipe corresponds to the equivalent diameter. The equivalent diameter ($d_{eq}$) is defined as $d_{eq}=4A/p$ in which A is a sectional area of the pipe, and p is a wetted perimeter length (circumferential length) of the pipe. In the case of the cylindrical pipe, this equivalent diameter corresponds to the diameter of the cylindrical pipe. The equivalent diameter is used for presuming fluidity or heat conducting characteristic of the pipe on the basis of data of the equivalent cylindrical pipe, and expresses a spatial scale (a representative length) of a phenomenon. The equivalent diameter is: $d_{eq}=4a^2/4a=a$ in a squared pipe having a side (a);

$$d_{eq}=a/\sqrt{3}$$

in an equilateral triangular pipe having a side (a); and $d_{eq}=2h$ in a flow between paralleled plates having a channel height (h) (see, for example, edited by Nippon Kikai Gakkai, "Kikai Kougaku Jiten," 1997, published by Maruzen, K. K.).

When causing water to flow into a pipe, inserting a narrow pipe into the pipe along the central axis thereof and then injecting a colored solution into the water, the colored solution flows in the form of a single line while the flow velocity of the water is small or slow. Thus, the water flows straightly and in parallel to the wall of the pipe. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a pipe is represented by the following equation:

$$Re=D<v_x>\rho/\mu$$

wherein D represents the equivalent diameter of the pipe, $<v_x>$ represents the sectional average velocity, $\rho$ represents the density of the flow, and $\mu$ represents the viscosity of the flow. As can be understood from this equation, the Reynolds number is smaller as the equivalent diameter is smaller. Therefore, in the case that the equivalent diameter is in the order of μm, a stable laminar flow is apt to be formed. In addition, because the physical properties of the solution, such as the density and the viscosity thereof, also have influence on the Reynolds number. As the density is smaller and/or the viscosity is larger, the Reynolds number is smaller. It can be, therefore, understood that a laminar flow is apt to be formed in that case.

The Reynolds number representing such a critical value is called "critical Reynolds number". The critical Reynolds number is not necessarily definite. However, roughly, the following values are criteria:

Re<2,300 laminar flow;
Re>3,000 turbulent flow; and
3,000≧Re≧2,300 transition state.

As the equivalent diameter of a channel is smaller, the surface area per unit volume (specific surface area) thereof is larger. When the channel turns into a micro-scale, the specific surface area becomes remarkably large so that the conduction efficiency of heat through the wall of the channel becomes very high. Since the heat conduction time (t) of a fluid flowing in the channel is represented by: $t=d_{eq}^2/\alpha$ (in which $\alpha$ is the heat diffusion rate of the fluid), the heat conduction time becomes shorter as the equivalent diameter becomes smaller. That is, if the equivalent diameter becomes 1/10, the heat conduction time becomes 1/100. Thus, when the equivalent diameter is in a micro-scale, the heat conduction speed is very high.

Precisely, in a micro-size space where the equivalent diameter is in micro scale, flow has a small Reynolds number, and thus, a flow reaction can be conducted with the laminar flow being preferential. In addition, the interface between laminar flows has a very large interface surface area. This enables high-speed and precise mixing of component molecules owing to molecular diffusion between laminar flows, with keeping laminar flows. Further, use can be made of a channel wall having a large surface area, which enables precise temperature control; and controlling the flow rate in flow reaction enables precise control of reaction time. Therefore, among the channels where the laminar flow can be formed according to the present invention, a channel of micro scale that has an equivalent diameter with which the reaction can be highly controlled is defined as a micro reaction site.

As shown in the above explanation of Reynolds number, formation of laminar flow is largely influenced not only by the size of equilibrium diameter of the channel but also by flowing conditions that include solution physical properties such as viscosity and density. Therefore, in the present invention, the equivalent diameter of the channel is not particularly limited as long as a laminar flow is formed in the channel. The equivalent diameter is preferably of a size with which a laminar flow easily forms. The equivalent diameter of the channel is preferably 10 mm or less, and it is more preferably 1 mm or less since a micro reaction site can be formed. The equivalent diameter is further preferably 10 μm to 1 mm, and particularly preferably 20 to 300 μm.

A typical example of the reaction apparatus (reactor) having such a micro-scale size flow path (channel), which can be particularly preferably used in the present invention, is commonly called "microreactor" and is being developed greatly in recent years (see, for example, W. Ehrfeld, V. Hessel, and H. Loewe, "Microreactor," 1Ed. (2000) Wiley-VCH).

The above-mentioned general micro-reactor is provided with plural micro-channels each having an equivalent diameter (obtained by converting the section thereof to a corresponding circle) of several micrometers to several hundred micrometers; and a mixing space connected to these micro-channels. In the micro-reactor, plural solutions are introduced through the plural micro-channels into the mixing space, thereby mixing the solutions, or mixing the solutions and simultaneously causing chemical reaction.

Next, the following describes major different points of reaction by use of the micro-reactor from reaction based on a batch type by use of a tank or the like. In chemical reaction of a liquid phase and chemical reaction in two liquid phases, molecules generally encounter each other on the interface between the reaction solutions, to cause the reaction. Therefore, when the reaction is conducted in a microscopic space (micro-channel), the area of the interface becomes large in relation to the space so that the efficiency of the reaction increases remarkably. In addition, about the diffusion of molecules, the diffusion time is in proportion with the square of diffusion distance. This fact means that as the scale is made smaller, the mixing of the reaction solutions advances more by the diffusion of the molecules, so as to cause the reaction more easily even if the reaction solutions are not actively mixed. Further, in the microscopic space, flows have small Reynolds numbers (dimensionless number by which the flow is characterized), the flows tend to turn preferentially to laminar flows. Therefore, the molecules existent in the solutions are exchanged from one laminar flow to another laminar flow on the interface where the solutions are in the states of laminar flows, and the transferred molecules cause precipitation or reaction.

When a micro-reactor, which has characteristics as described above, is used, the reaction time and temperature between the solutions therein can be more precisely controlled, compared with a conventional batch system, in which, for example, a tank having a large volume is used as a reaction site. Further, in the batch system, in particular, between solutions having a large reaction speed, sometimes reaction advances on a reaction contact face generated at the initial stage of mixing the solutions, and further a primary product generated by the reaction between the solutions subsequently undergoes reaction in the container. Therefore, there may be a possibility that the resultant product becomes non-homogeneous or crystals of the product grow beyond necessity in the mixing container (batch) to get coarse. Contrary to the above, according to a micro-reactor that can be used in the present invention, solutions hardly remain in the mixing space (e.g. a mixing container) so as to flow continuously. Consequently, it is possible to restrain a primary product generated by the reaction between the solutions from undergoing subsequent reaction while the primary product remains in the mixing space. Thus, a pure primary product, which has been hardly taken out hitherto, can be taken out. Moreover, it becomes difficult that crystals aggregate in the mixing space or get coarse.

Further, when a chemical substance that can be produced in only a small amount by use of an experimental producing-apparatus, is tried to produce in a large amount by use of large-scale manufacturing facilities (i.e. scaling up), huge labor and very long period of time have been required hitherto, to gain the reproducibility of the manufacture in large-scale manufacturing facilities of a batch system as similar as the reproducibility of the production in the experimental producing-apparatus. However, by arranging a plurality of producing lines each using a micro-reactor in parallel (numbering-up) according to a necessary production quantity, labor and time period for gaining such the reproducibility may be largely reduced.

The method for forming the channel of the laminar flow that can be used in the present invention will be explained. It is relatively easy to form a channel with a size of 1 mm or more with generally known micro machining techniques, while it is exceptionally difficult to form a channel with a size of 1 mm or less (micro size), especially with a size of 500 μm or less. A micro-size channel (micro-channel) is formed on a solid substrate by micro processing technique in many cases. The material of the substrate may be any stable material that is not apt to be corroded. Examples of the material include metal (e.g. stainless steel, hastelloy (Ni—Fe based alloy), nickel, aluminum, silver, gold, platinum, tantalum, and titanium), glass, plastics, silicone, Teflon(registered trademark), and ceramics.

Representative examples of the micro processing technique for producing the micro-channel include a LIGA (Roentgen-Lithographie Galvanik Abformung) method using X-ray lithography, a high aspect ratio photolithography method using EPON SU-8(trade name), a micro discharge processing method (μ-EDM (micro electro discharge machining)), a high aspect ratio processing method for silicon by deep RIE (reactive ion etching), a hot emboss processing method, a photo-fabrication method, a laser processing method, an ion beam processing method, and a mechanical micro cutting method using a micro tool made of such a hard material as diamond. These techniques may be used alone or in combination. Preferable micro processing techniques are the LIGA method using X-ray lithography, the high-aspect ratio photolithography method using EPON SU-8, the micro discharge processing method (μ-EDM), and the mechanical micro cutting processing method. In recent years, investigations have been made for applying a micro-injection molding technique to engineering plastics.

When the micro channel is assembled, a joining technique is often used. A normal joining technique is roughly divided into solid-phase joining and liquid-phase joining. In joining methods generally used, a typical joining method includes pressure welding and diffusion bonding as the solid-phase joining; and welding, eutectic bonding, soldering, and gluing as the liquid joining. Further, at the time of assembling, it is desirable to use a highly precise joining method in which dimension accuracy is maintained in such a way that deterioration of material due to high temperature heating, or destruction of a micro-structure such as a flow passage by a large deformation of material does not take place. Such a technique includes a silicon direct joining, anode joining, surface activation joining, direct joining using hydrogen bond, joining using aqueous HF solution, Au—Si eutectic bonding, and void-free bonding.

The micro-channels that can be used in the present invention are not limited to channels formed on a solid substrate by use of the micro processing technique, and may be, for example, various available fused silica capillary tubes each having an inner diameter of several micrometers to several hundred micrometers. Various silicon tubes, fluorine-containing resin tubes, stainless steel pipes, and PEEK (polyetheretherketone) pipes each having an inner diameter of several micrometers to several hundred micrometers, which are commercially available as parts for high-performance liquid chromatography or gas chromatography, can also be used.

Hitherto, with respect to micro-reactors, devices that are aimed to improve reaction efficiency and the like, have been reported. For example, JP-A-2003-210960, JP-A-2003-210963 and JP-A-2003-210959 are concerned with micro-mixers. In the present invention, these micro-devices may also be used.

The micro-channel that can be used in the invention may be subjected to a surface treatment according to an object. In particular, when a surface is treated with an aqueous solution, since the adsorption of a sample to glass or silicon may become a problem, the surface treatment is important. In the fluid control in the micro-sized flow passage, it is desirable to realize this without incorporating a movable part requiring a complicated manufacturing process. For example, a hydrophilic region and a hydrophobic region are prepared in the channel by the surface treatment, so that it becomes possible to treat a fluid by using a difference in surface tension exerting on the boundary between these regions. The method used for surface-treating glass or silicon in many cases is hydrophobic or hydrophilic surface-treatment by using a silane coupling agent.

In order to introduce a reagent, sample, or the like into the channels and mix, a fluid control function is needed. Specifically, since the behavior of the fluid in the micro channel has properties different from those of a macro-scale, a control method appropriate for the micro-scale should be considered. A fluid control method is classified into a continuous flow system and a droplet (liquid plug) system according to the formation, while it is also classified into an electric driving system and a pressure driving system according to the driving force.

A more detailed description of these systems will be given hereinafter. The most widely used system as a formation for treating a fluid is the continuous flow system. When the flow is controlled in the continuous flow system, generally, the entire portion inside the micro-channel is filled with a fluid, and the fluid as a whole is driven by a pressure source such as a syringe pump that is provided outside the channel. In this method, although there is such a difficulty that dead volume is large, and the like, the continuous flow system has such a great merit that the control system can be realized with a relatively simple set-up.

As a system which is different from the continuous flow system, there is provided the droplet (liquid plug) system. In this system, droplets partitioned by air are made to move inside the reactor or inside the channel leading to the reactor, and each of the droplets is driven by air pressure. During this process, a vent structure for allowing air between droplets and channel walls, or air between the droplets as necessary, to escape to the outside; a valve structure for maintaining pressure inside the branched channels independently from pressure at other portions; and the like, must be provided inside the reactor system. Further, a pressure control system that is formed by a pressure source or a switching valve must be provided outside the reactor system in order to move the droplets by controlling the pressure difference. Thus, in the liquid droplet system, although the apparatus configuration and the structure of the reactor become rather complicated as stated above, a multi-stage operation is enabled, for example, plural droplets are individually operated and some reactions are sequentially performed, and the degree of freedom concerning the system configuration becomes high.

As the driving system for performing the fluid control, there are generally and widely used an electrical driving method in which a high voltage is applied between both ends of a flow passage (channel) to generate an electro-osmotic flow, thereby fluid is moved; and a pressure driving method in which a pressure is applied to a fluid at the outside of the passage using a pressure source to move the fluid. It has been known that both systems are different in that, for example, as the behavior of the fluid, the flow velocity profile in the cross-section of the flow passage becomes a flat distribution in the case of the electrical driving system, whereas it becomes a hyperbolic flow distribution in the pressure driving system, in which the flow velocity is high at the center of the flow passage and low at the wall surface part. Therefore, the electrical driving system is suitable for such an object that a movement is made while the shape of a sample plug or the like is kept. In the case where the electrical driving system is performed, since it is necessary that the inside of the flow passage is filled with the fluid, the form of the continuous flow system must be adopted. However, since the fluid can be treated by an electrical control, a comparatively complicated process is also realized, for example, a concentration gradient varying with time is formed by continuously changing the mixing ratio of two kinds of solutions. In the case of the pressure driving system, the control can be made irrespective of electrical properties of the fluid, and secondary effects such as heat generation or electrolysis may not be considered, and therefore, an influence on the substrate (component) hardly exists, and its application range is wide. On the contrary, a pressure source must be prepared outside, and for example, response characteristics to manipulation are changed according to the magnitude of a dead volume of a pressure system, and it is necessary to automate the complicated process.

In the present invention, although a method to be used as a fluid control method is suitably selected according to its object, the pressure driving system of the continuous flow system is preferable.

The temperature control of the channel for use in the present invention may be performed by putting the whole device having a passage in a container in which the temperature is controlled; or forming a heater structure such as a metal resistance wire or polysilicon in the device, and performing a thermal cycle in such a manner that the heater structure is used when heating, and cooling is natural cooling. With respect to the sensing of temperature, when a metal resistance wire is used, it is preferable that the same resistance wire as the heater is additionally formed, and the temperature detection is performed on the basis of the change of the resistance value of the additional wire. When the polysilicon is used, it is preferable that a thermocouple is used to detect the temperature. Further, heating and cooling may be performed from the outside by bringing a Peltier element into contact with the channel. A suitable method is selected in accordance with the use, the material of the channel body, and the like.

In the present invention, the production of the pigment or the preparation of the pigment dispersion is performed while flowing in a channel(s), that is, by a continuous flowing method. Thus, the reaction time is controlled by a time during which the channel retains the flow (i.e. retention time). When the equivalent diameter is constant, the retention time is determined by the length of the channel and the induction speeds of the reaction solutions. Further, the length of the channel is not particularly limited, but it is preferably 1 mm or more but 10 m or less, more preferably 5 mm or more but 10 m or less, and particularly preferably 10 mm or more but 5 m or less.

The number of channels that can be used in the present invention may be any number appropriately provided with a reactor. The number of channels may be one. Alternately, many channels may be arranged in parallel (i.e. numbering-up) as needed, to increase a processing amount thereof.

Figure 4:
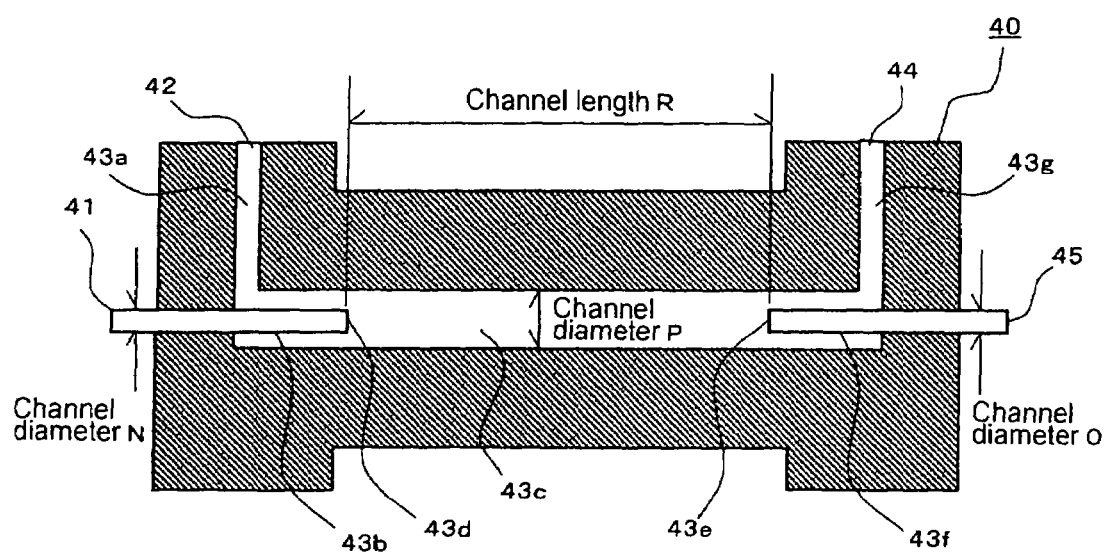
FIG. 4 is an explanatory view of a reactor having a cylindrical tube-type channel in which channels are provided to insert at both sides thereof.

Typical examples of a reactor that can be used in the present invention are illustrated in FIGS. 1-1 to 4. Needless to say, the present invention is not limited to these examples.

Figures 1, 2:
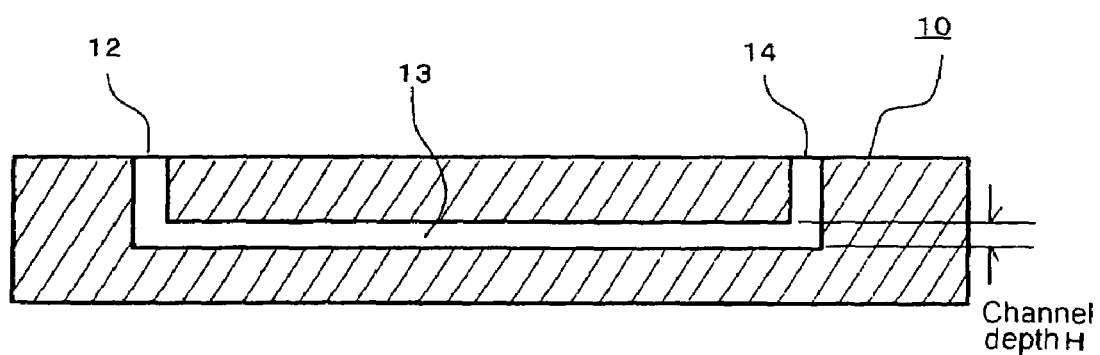

FIG. 1-1 is an explanatory view of a reactor (10) having a Y-shaped channel. FIG. 1-2 is a sectional view taken on I-I line of FIG. 1-1. The shape of the section perpendicular to the direction of the length of the channel is varied dependently on the micro processing technique to be used, and is a shape close to a trapezoid or a rectangle. When widths and depths (in particular, width C and depth H) of the Y-shaped channel are made into micro-sizes, solutions introduced from introducing ports 11 and 12 with pumps or the like are caused to flow via introducing channels 13a or 13b, respectively, and are brought into contact with each other at a fluid confluence points 13d to form stable laminar flows to flow through a reaction channel 13c. While the solutions flow as the laminar flows, a solute contained in a laminar flow is mixed or reacted with another solute contained in another laminar flow each other by molecular diffusion on the interface between the laminar flows. Solutes, which diffuse very slowly, may not be diffused or mixed between the laminar flows; and, in some cases, the solutes are not mixed until they reach a discharge port 14. In such a case that the two introduced solutions are easily mixed in a flask, the flow of the mixed solutions may become homogeneous flow in the discharge port if a channel length F is made long. However, when the channel length F is short, laminar flows are kept up to the discharge port. When the two introduced solutions are not mixed in a flask and are separated into phases, the two solutions naturally flow as laminar flows to reach the discharge port 14.

Figures 1, 2:
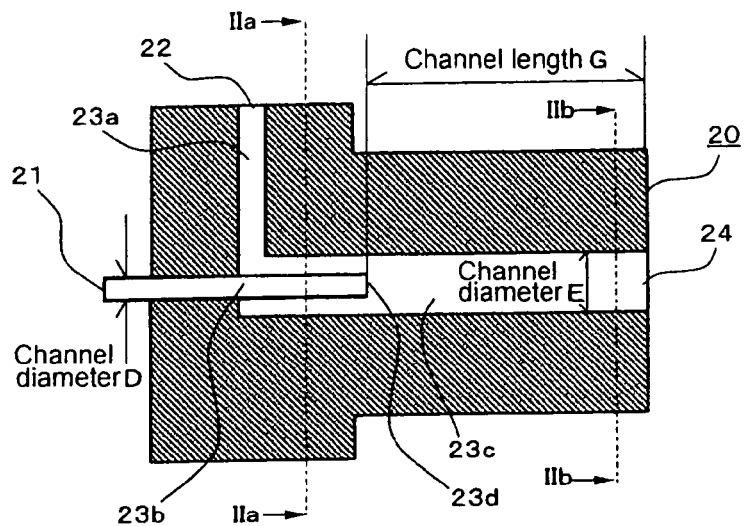
Figure 2:
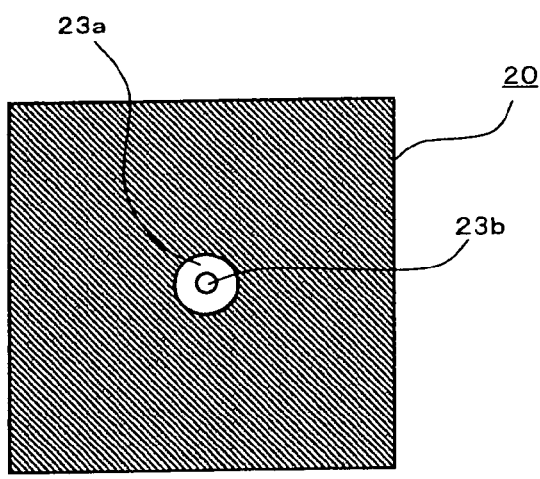
Figures 2, 3:
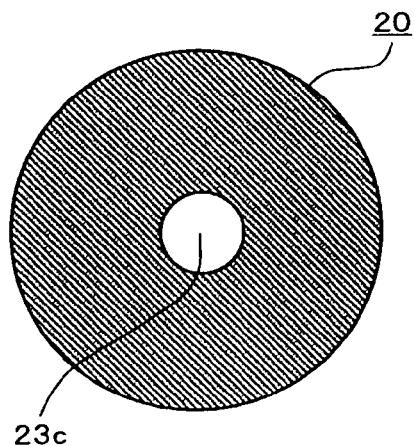
Figures 1, 3:
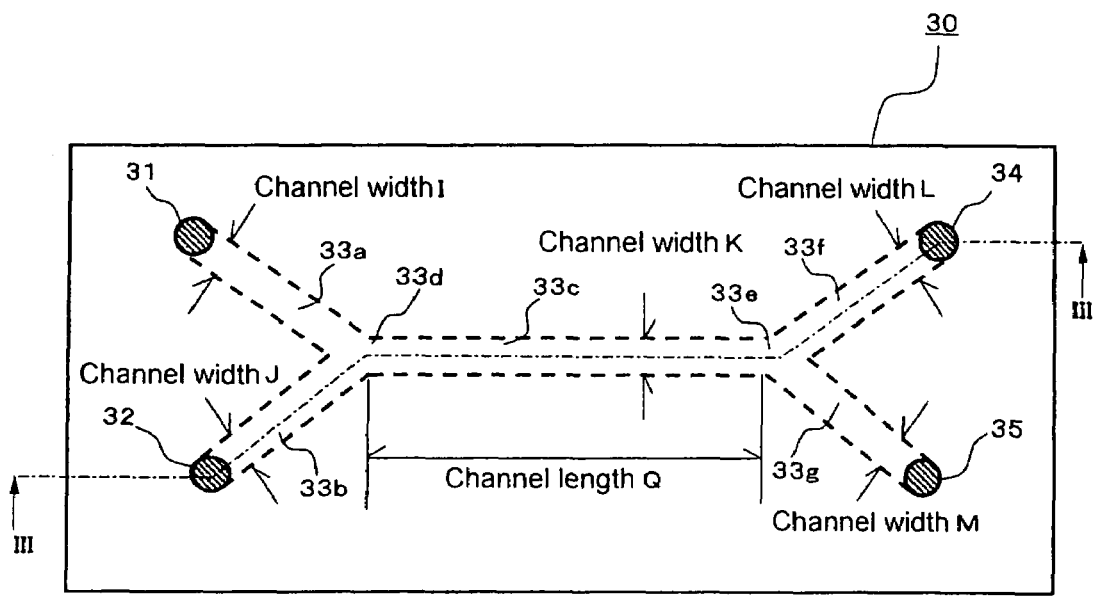
Figures 2, 3:
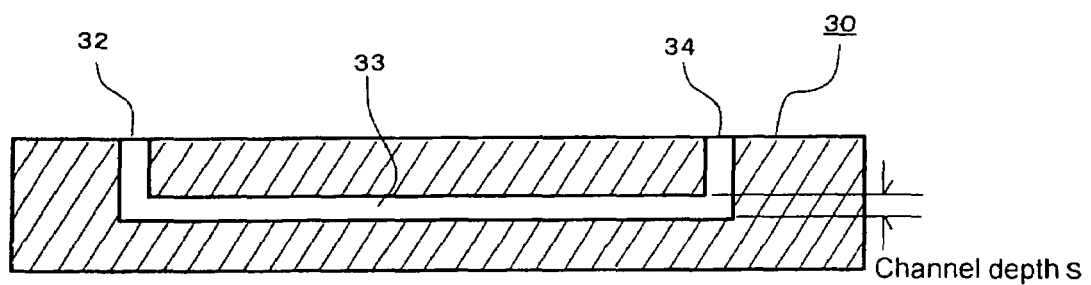

FIG. 2-1 is an explanatory view of a reactor (20) having a cylindrical pipe-type channel in which a channel is inserted at one side thereof. FIG. 2-2 is a sectional view of the reactor taken on line IIa-IIa of FIG. 2-1, and FIG. 2-3 is a sectional view of the reactor taken on line IIb-IIb of FIG. 2-1. The shape of the section perpendicular to the direction of the length of the channel is a circular shape or a shape close thereto. When the channel diameters (D and E) of the cylindrical pipes are micro-sizes, solutions introduced from introducing ports 21 and 22 with pumps or the like are caused to flow via introducing channels 23b or 23a, respectively, and are brought into contact with each other at a fluid confluence point 23d to form stable cylindrical laminar flows to flow through a reaction channel 23c. While the solutions flow as the cylindrical laminar flows, solutes contained in the separate laminar flows are mixed or reacted with each other by molecular diffusion on the interface between the laminar flows. This matter is the same as in the case of the reactor, as illustrated in FIG. 1-1. The apparatus having the cylindrical pipe-type channel has the following characteristics: that the apparatus can make the contact interface between the two solutions larger than the apparatus illustrated in FIG. 1-1; and since the contact interface has no portion to contact the wall face of the apparatus, it does not happen that crystal growth is caused from the contact portion with the wall face as in the case that a solid (crystal) is generated by reaction, thereby the apparatus gives only a low possibility that the channel is blocked.

FIGS. 3-1 and 4 illustrate apparatuses obtained by improving the apparatuses illustrated in FIGS. 1-1 and 2-1, respectively, in order that when flows of two solutions arrive at outlets in the state that the flows are laminar flows, the laminar flows can be separated. When these apparatuses are used, reaction and separation can be attained at the same time. It is also possible to avoid phenomena that the two solutions are finally mixed so that the reaction between the solutions advances excessively, and that generated crystals get coarse. In the case that products or crystals are selectively present in one of the solutions, the products or crystals can be obtained with a higher concentration than in the case that the two solutions are mixed. Further, by linking a plurality of the apparatuses to each other, there are such advantages that an extracting operation is effectively performed.

In the present invention, a solution in which an organic pigment is homogeneously dissolved in an alkaline or acidic aqueous medium, is caused to flow, as a laminar flow, through the channel as described above, and in the course of this step of laminar flowing, the hydrogen ion exponent (pH) of the solution is changed, thereby producing organic pigment fine-particles and a dispersion containing the fine-particles. This is described in detail hereinafter.

The organic pigment produced in the present invention is not limited in the color tone thereof, and it may be a magenta pigment, a yellow pigment, or a cyan pigment. Specifically, the organic pigment may be a magenta pigment, a yellow pigment or a cyan pigment of a perylene, perynone, quinacridone, quinacridonequinone, anthraquinone, anthanthrone, benzimidazolone, condensed disazo, disazo, azo, indanthrone, phthalocyanine, triaryl carbonium, dioxazine, aminoanthraquinone, diketopyrrolopyrrole, thioindigo, isoindoline, isoindolinone, pyranthrone or isoviolanthrone-series pigment, or a mixture thereof.

More specifically, examples of the organic pigment include perylene-series pigments, such as C.I. Pigment Red 190 (C.I. No. 71140), C.I. Pigment Red 224 (C.I. No. 71127), and C.I. Pigment Violet 29 (C.I. No. 71129); perynone-series pigments, such as C.I. Pigment Orange 43 (C.I. No. 71105), and C.I. Pigment Red 194 (C.I. No. 71100); quinacridone-series pigments, such as C.I. Pigment Violet 19 (C.I. No. 73900), C.I. Pigment Violet 42, C.I. Pigment Red 122 (C.I. No. 73915), C.I. Pigment Red 192, C.I. Pigment Red 202 (C.I. No. 73907), C.I. Pigment Red 207 (C.I. Nos. 73900 and 73906), and C.I. Pigment Red 209 (C.I. No. 73905); quinacridonequinone-series pigments, such as C.I. Pigment Red 206 (C.I. No. 73900/73920), C.I. Pigment Orange 48 (C.I. No. 73900/73920), and C.I. Pigment Orange 49 (C.I. No. 73900/73920); anthraquinone-series pigments, such as C.I. Pigment Yellow 147 (C.I. No. 60645); anthanthrone-series pigments, such as C.I. Pigment Red 168 (C.I. No. 59300); benzimidazolone-series pigments, such as C.I. Pigment Brown 25 (C.I. No. 12510), C.I. Pigment Violet 32 (C.I. No. 12517), C.I. Pigment Yellow 180 (C.I. No. 21290), C.I. Pigment Yellow 181 (C.I. No. 11777), C.I. Pigment Orange 62 (C.I. No. 11775), and C.I. Pigment Red 185 (C.I. No. 12516); condensed disazo-series pigments, such as C.I. Pigment Yellow 93 (C.I. No. 20710), C.I. Pigment Yellow 94 (C.I. No. 20038), C.I. Pigment Yellow 95 (C.I. No. 20034), C.I. Pigment Yellow 128 (C.I. No. 20037), C.I. Pigment Yellow 166 (C.I. No. 20035), C.I. Pigment Orange 34 (C.I. No. 21115), C.I. Pigment Orange 13 (C.I. No. 21110), C.I. Pigment Orange 31 (C.I. No. 20050), C.I. Pigment Red 144 (C.I. No. 20735), C.I. Pigment Red 166 (C.I. No. 20730), C.I. Pigment Red 220 (C.I. No. 20055), C.I. Pigment Red 221 (C.I. No. 20065), C.I. Pigment Red 242 (C.I. No. 20067), C.I. Pigment Red 248, C.I. Pigment Red 262, and C.I. Pigment Brown 23 (C.I. No. 20060); disazo-series pigments, such as C.I. Pigment Yellow 13 (C.I. No. 21100), C.I. Pigment Yellow 83 (C.I. No. 21108), and C.I. Pigment Yellow 188 (C.I. No. 21094); azo-series pigments, such as C.I. Pigment Red 187 (C.I. No. 12486), C.I. Pigment Red 170 (C.I. No. 12475), C.I. Pigment Yellow 74 (C.I. No. 11714), C.I. Pigment Red 48 (C.I. No. 15865), C.I. Pigment Red 53 (C.I. No. 15585), C.I. Pigment Orange 64 (C.I. No. 12760), and C.I. Pigment Red 247 (C.I. No. 15915); indanthrone-series pigments, such as C.I. Pigment Blue 60 (C.I. No. 69800); phthalocyanine-series pigments, such as C.I. Pigment Green 7 (C.I. No. 74260), C.I. Pigment Green 36 (C.I. No. 74265), Pigment Green 37 (C.I. No. 74255), Pigment Blue 16 (C.I. No. 74100), C.I. Pigment Blue 75 (C.I. No. 74160:2), and 15 (C.I. No. 74160); triaryl carbonium-series pigments, such as C.I. Pigment Blue 56 (C.I. No. 42800), and C.I. Pigment Blue 61 (C.I. No. 42765:1); dioxazine-series pigments, such as C.I. Pigment Violet 23 (C.I. No. 51319), and C.I. Pigment Violet 37 (C.I. No. 51345); aminoanthraquinone-series pigments, such as C.I. Pigment Red 177 (C.I. No. 65300); diketopyrrolopyrrole-series pigments, such as C.I. Pigment Red 254 (C.I. No. 56110), C.I. Pigment Red 255 (C.I. No. 561050), C.I. Pigment Red 264, C.I. Pigment Red 272 (C.I. No. 561150), C.I. Pigment Orange 71, and C.I. Pigment Orange 73; thioindigo-series pigments, such as C.I. Pigment Red 88 (C.I. No. 73312); isoindoline-series pigments, such as C.I. Pigment Yellow 139 (C.I. No. 56298), C.I. Pigment Orange 66 (C.I. No. 48210); isoindolinone-series pigments, such as C.I. Pigment Yellow 109 (C.I. No. 56284), and C.I. Pigment Orange 61 (C.I. No. 11295); pyranthrone-series pigments, such as C.I. Pigment Orange 40 (C.I. No. 59700), and C.I. Pigment Red 216 (C.I. No. 59710); and isoviolanthrone-series pigments, such as C.I. Pigment Violet 31 (C.I. No. 60010).

Preferred pigments are quinacridone-, diketopyrrolopyrrole-, condensed disazo-, or phthalocyanine-series pigments; and particularly preferred pigments are quinacridone-, condensed disazo-, or phthalocyanine-series pigments.

In the present invention, two or more kinds of the organic pigments or a solid solution of the organic pigment, or a combination of the organic pigment with an inorganic pigment may be used.

It is necessary that the organic pigment is homogeneously dissolved in an alkaline or acidic aqueous medium. It depends on the nature of the pigment whether the organic pigment in interest may be more easily dissolved homogeneously under either alkaline or acidic, to select the conditions in which the organic pigment be dissolved under alkaline or dissolved under acidic. In general, in the case of the pigment having in the molecule thereof a group dissociative under alkaline, the alkaline medium is used, and in the case of the pigment having no group dissociative under alkaline and having in the molecule thereof many nitrogen atoms, to which protons easily adhere, the acidic medium is used. For example, quinacridone-, diketopyrrolopyrrole-, and condensed disazo-series pigments are dissolved in the alkaline medium, and a phthalocyanine-series pigment is dissolved in the acidic medium.

Examples of a base that can be used in the case that the pigment is dissolved in alkaline aqueous medium, include inorganic bases, such as sodium hydroxide, calcium hydroxide, and barium hydroxide; and organic bases, such as trialkylamine, diazabicycloundecene (DBU), and metal alkoxides. Among these, the inorganic bases are preferable.

The amount of the base to be used is not particularly limited, as long as the base in the amount can make the pigment be dissolved homogeneously. In the case of the inorganic base, the amount thereof is preferably from 1.0 to 30 mole equivalents, more preferably from 2.0 to 25 mole equivalents, and further preferably from 3 to 20 mole equivalents, to the pigment. In the case of the organic base, the amount thereof is preferably from 1.0 to 100 mole equivalents, more preferably from 5.0 to 100 mole equivalents, and further preferably form 20 to 100 mole equivalents, to the pigment.

Examples of an acid to be used in the case that the pigment is dissolved in the acidic aqueous medium, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the pigment be dissolved homogeneously. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably form 30 to 200 mole equivalent, to the pigment.

The following describes the aqueous medium. The aqueous medium in the present invention is water alone, or a mixed solvent with an organic solvent soluble in (or miscible with) water. The addition of the organic solvent is performed in the case that, according to use of only water, it is impossible to homogeneously dissolve the pigment or a dispersing agent, or it is impossible to obtain a viscosity necessary for flow in the channel, and in the case necessary for forming laminar flow. Thus, the addition of the water-soluble organic solvent is not essential, but is performed in many cases. Examples of the organic solvent to be added include polyhydric alcohol-series solvents, typified, for example, by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower monoalkyl ether-series solvents of a polyhydric alcohol, such as ethylene glycol monomethyl (or ethyl) ether, diethylene glycol monomethyl (or ethyl)ether, and triethylene glycol monoethyl (or butyl)ether; polyether-series solvents, such as ethylene glycol dimethyl ether (monoglyme), diethylene glycol dimethyl ether (diglyme), and triethylene glycol dimethyl ether (triglyme); amide-series solvents, such as dimethylformamide, dimethylacetamide, 2-pyrrolidone, N-methyl-2-pyrrolidone, 1,3-dimethyl-2-imidazolidinone, urea, and tetramethyl urea; sulfur-containing solvents, such as sulfolane, dimethylsulfoxide, and 3-sulfolene; polyfunctional solvents, such as diacetone alcohol, and diethanolamine; carboxylic acid-series solvents, such as acetic acid, maleic acid, docosahexaenoic acid, trichloroacetic acid, and trifluoroacetic acid; and sulfonic acid-series solvents, such as methanesulfonic acid, and trifluorosulfonic acid. These solvents may be mixed in combination with two or more thereof, and used.

The organic solvent is preferably an amide-series solvent or a sulfur-containing solvent in the case of alkaline, and a carboxylic acid-series solvent, a sulfur-containing solvent or a sulfonic acid-series solvent in the case of acidic; more preferably the sulfur-containing-series solvent in the case of alkaline, and a sulfonic acid-series solvent in the case of acidic; and particularly preferably dimethylsulfoxide (DMSO) in the case of alkaline, and methanesulfonic acid in the case of the acidic.

The blend ratio of water to the organic solvent is not particularly limited, as long as at the ratio it is possible to dissolve the pigment to be used homogeneously. The blend ratio of water to the organic solvent is preferably from 0.05 to 10 (mass ratio) in the alkaline aqueous medium. In the case that an inorganic acid is used in the acidic aqueous medium, it is preferable to use, for example, sulfuric acid alone without using any organic solvent. When an organic acid(s) is used, the organic acid itself is an organic solvent. Thus, in order to adjust the viscosity and the solubility of the aqueous medium, a plurality of acids are mixed or water is added thereto. Preferably, the mass ratio of water to the organic solvent(s) (organic acid(s)) is from 0.005 to 0.1.

In the present invention, it is preferred to introduce into the channel a solution homogeneously dissolving an organic pigment or a material therefor. When a suspension is introduced into the channel, the size of the particles therein becomes large or pigment fine-particles having a wide particle size distribution are generated. This results, as the case may be, to be apt to block the channel. The wording "homogeneously dissolving" means a solution in which turbidity (muddiness) is hardly observed when the solution is observed under visible light. In the present invention, a solution obtained by filtration through a micro-filter having pores of 1 μm or less in diameter, or a solution which does not contain any substance remaining after the solution is filtrated through a filter having pores of 1 μm or less in diameter, is defined as a homogeneously dissolved solution (or a homogeneous solution).

The following describes the hydrogen ion exponent (pH). The hydrogen ion exponent (pH) is the common logarithm of the reciprocal number of a hydrogen ion concentration (molar concentration), and may be called the hydrogen exponent. The hydrogen ion concentration is the concentration of hydrogen ion H in a solution, and means the mole number of hydrogen ion present in a 1-liter solution. Since the hydrogen ion concentration changes in a very wide range, it is usually represented by the hydrogen ion exponent (pH). For example, pure water contains $10^{-7}$ mol of hydrogen ion at 1 atmosphere and 25° C. Thus, the pH thereof is 7, which is neutral. The aqueous solution having a pH of less than 7 is acidic, and the aqueous solution having a pH of more than 7 is alkaline. As a method of measuring the pH value, there are potentiometric and calorimetric measuring methods.

In the present invention, the hydrogen ion exponent (pH) is changed in the step of causing the solution to flow in a channel, thereby producing pigment fine particles. This process is performed using a channel having an introducing port different from an introducing port for the homogeneous solution of the organic pigment, for example, a channel having at least two introducing ports as illustrated in FIG. 1-1 or 1-2. Specifically, a homogeneous solution of an organic pigment is introduced into the introducing port 11 in FIG. 1-1 or the introducing port 21 in FIG. 2-1, and neutral, acidic or alkaline water or an aqueous solution in which a dispersing agent is dissolved is introduced into the introducing port 12 in FIG. 1-1 or the introducing port 22 in FIG. 2-1. The two solutions are brought into contact with each other in the channel 13c or 23c, thereby changing the hydrogen ion concentration, that is, the hydrogen ion exponent (pH), of the solution containing the organic pigment toward neutrality (pH 7). In the case that the equivalent diameter of the channel is in a micro-scale, any flow therein has a small Reynolds number. Consequently, stable laminar flows (cylindrical laminar flows in FIG. 2-1) are formed, and water and ions diffuse and transfer through a stable interface between the two flows so that the hydrogen ion exponent (pH) of the solution containing the organic pigment is gradually changed toward neutrality. The pigment is not easily dissolved in an aqueous medium at a low alkalinity or a low acidity, therefore, as the hydrogen ion exponent (pH) of the solution containing the organic pigment is changed toward neutrality, pigment fine particles are gradually precipitated.

In the case that pigment fine particles are produced from a pigment dissolved in an alkaline aqueous medium, the change of the hydrogen ion exponent (pH) is generally performed within the range of 16.0 to 5.0, preferably 16.0 to 10.0. In the case that pigment fine particles are produced from a pigment dissolved in an acidic aqueous medium, the change of the hydrogen ion exponent (pH) is generally performed within the range of 1.5 to 9.0, preferably 1.5 to 4.0. The range of the change depends on the value of the hydrogen ion exponent (pH) of the organic pigment solution, but the range may be a range sufficient for promoting the precipitation of the organic pigment.

The pigment fine particles generated in the channel of a micro-scale flow into an outlet in the state that the particles are contained in one of the laminar flows, without diffusing. Therefore, when a channel apparatus having outlets designed, as illustrated in FIG. 3-1 or 4, is used, the laminar flow containing the organic pigment fine-particles can be separated. When this method is used, a high-concentration pigment dispersion can be obtained, and simultaneously the water-soluble organic solvent, the alkaline or acidic water, and an excessive of the dispersing agent used to prepare the homogeneous solution can be removed. Thus, this process is advantageous. It is also possible to avoid the following: that the two solutions are finally mixed so that pigment crystals get coarse or deteriorate.

When pigment fine particles are produced, the reaction temperature inside the channel is preferably within such a range that the solvent is not solidified or vaporized, and it is preferably from −20 to 90° C., more preferably from 0 to 50° C., and particularly preferably from 5 to 15° C.

When pigment fine particles are produced, the flow velocity (flow rate) of the fluid which flows in the channel is advantageously from 0.1 mL/hour to 300 L/hour, preferably from 0.2 mL/hour to 30 L/hour, more preferably from 0.5 mL/hour to 15 L/hour, and particularly preferably from 1.0 mL/hour to 6 L/hour.

In the present invention, the concentration of a substrate (such as an organic pigment or a reaction component thereof) which flows in the channel, is generally in the range of 0.5% to 20% by mass, preferably in the range of 1.0% to 10% by mass.

In the method of the present invention for producing organic pigment fine-particles, a dispersing agent can be incorporated into the solution containing an organic pigment and/or an aqueous solution (aqueous medium) for changing the hydrogen ion exponent (pH). The dispersing agent has a function (1) that the dispersing agent is rapidly adsorbed on the surface of the precipitated pigment, to form fine pigment particles, and (2) that these particles are prevented from aggregating again. In the present invention, as the dispersing agent, use can be made of an anionic, cationic, amphoteric, nonionic or pigmentary and low-molecular-weight or polymer dispersing agent. These dispersing agents may be used alone or in combination. Dispersing agents to be used in dispersion of the pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. N-acyl-N-alkyltaurine salts are particularly preferable. As the N-acyl-N-alkyltaurine salts, those described in JP-A-3-273067 are preferable. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

Specific examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers, cellulose derivatives, and starch derivatives. Besides, natural polymers can be used, examples of which include alginic acid salts, gelatin, albumin, casein, gum arabic, tragacanth gum, and ligninsulfonic acid salts. Polyvinyl pyrrolidone is particularly preferable. These polymer dispersing agents may be used alone or in combination of two or more thereof.

Examples of a preferred embodiment include an embodiment, in which the anionic dispersing agent is incorporated in the aqueous medium, and the nonionic dispersing agent and/or the polymer dispersing agent are (is) incorporated in the solution in which the organic pigment is dissolved.

The amount of the dispersing agent to be blended is preferably from 0.1 to 1,000 parts by mass, more preferably from 1 to 500 parts by mass, and further preferably from 10 to 250 parts by mass, to 100 parts by mass of the pigment, to further improve the uniform dispersibility and storage stability of the pigment. If the amount of the dispersing agent to be added is too small, the dispersion stability of the organic pigment fine particles may not be improved, in some cases.

In the measuring method of fine particles, the average size of the group of the particles can be expressed by a numerical value. Examples of the numerical value which is widely used, include mode diameter, which shows the maximum value of the particle size distribution; medium diameter, which corresponds to the central value of the integration distribution curve thereof; and various average diameters (such as length average, area average, and weight average). The particle diameter size of the organic pigment fine-particles produced by the method of the present invention is arbitrary as far as the channel is not blocked. The particle diameter size is preferably 1 µm or less, more preferably from 3 to 800 nm, and particularly preferably from 5 to 500 nm in terms of the mode diameter.

Having a uniform particle size of fine-particles, i.e. having a monodisperse fine-particle system, is an important factor that decides performances of the particles, since not only it means that the particles included therein have uniform diameters but also it means that there is no fluctuation among particles in chemical composition and crystal structure inside the particles. In particular, this factor is regarded as important that governs the characteristics of the particles, in ultrafine-particles having nanometer order particle sizes. The method of the present invention is excellent not only it can control the size of particles but also it can obtain particles of uniform sizes. The arithmetic standard deviation is used as an index of having a uniform size. The arithmetic standard deviation of the pigment fine-particles produced according to the present invention is preferably 130 nm or less, particularly preferably 80 nm or less. The arithmetic standard deviation is obtained by subtracting the 16% particle diameter from the 84% particle diameter in the integrated distribution, and further dividing this difference by 2, in a method obtaining the standard deviation assuming that a particle size distribution be a normal distribution.

The method of the present invention for producing an organic pigment can widely be applied to the above-mentioned pigments. Specifically, the method of producing an unsubstituted or substituted quinacridone pigment is described as an example hereinafter. In the present invention, an unsubstituted or substituted quinacridone pigment represented by the formula (I) is produced in an apparatus having a channel for forming laminar flow. First, the substituents in formula (I) are described.

X and Y each independently represent a fluorine atom, a chlorine atom, an alkyl group having 1 to 3 carbon atoms, an alkoxy group having 1 to 3 carbon atoms, or a $COOR_a$ group (in which $R_a$ represents a hydrogen atom, or an alkyl group having 1 to 10 carbon atoms). Specifically, examples of the group represented by X and Y other than the fluorine atom, chlorine atom and carboxyl group, include an alkyl group, such as methyl, ethyl, propyl and isopropyl; an alkoxy group, such as methoxy, ethoxy, propyloxy and isopropoxy; and an alkoxycarbonyl group, such as methoxycarbonyl, ethoxycarbonyl, isopropoxycarbonyl and octyloxycarbonyl.

Preferably, X and Y each independently are a chlorine atom or an alkyl group, particularly preferably a methyl group.

m and n each independently are 0, 1 or 2, particularly preferably 1.

Preferred specific examples of the quinacridone-series pigment to be synthesized, include an unsubstituted or substituted quinacridones, such as unsubstituted quinacridone, 2,9-dimethylquinacridone, and 4, 11-dichloroquinacridone; and solid solutions thereof. When these are represented by C. I. numbers, the following are listed: Pigment Violet 19, Pigment Red 122, Pigment Red 207, Pigment Orange 48, Pigment Orange 49, Pigment Red 209, Pigment Red 206, Pigment Violet 42, and the like. However, the quinacridone-series pigment is not limited to these.

The production of the unsubstituted or substituted quinacridone pigment can be performed according to a usual synthesis process, preferably applying the process to the above-described apparatus or device having the channel with an equivalent diameter of 10 mm or less.

Examples of the solvent, which can be used in the present invention, include the above-mentioned organic solvent, dispersing agent, surfactant, or water, or the combination thereof. If necessary, for example, a water-soluble organic solvent which is added to an ink composition, and other components may be added to the solvent. As these solvent components, for example, constituents of pigment dispersing agents, as described in JP-A-2002-194263 and JP-A-2003-26972, can be used.

The reaction fluids may be fluids which are miscible with each other, or fluids which are immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

In the case that a gas such as air or oxygen is used as an oxidizing agent, a method of dissolving the gas into the reaction fluid or introducing the gas into the channel can be taken. Preferably, the method of introducing the gas is taken.

The reaction temperature is preferably within the range in which the solvent is not solidified or vaporized, and it is preferably −20° C. to 250° C., more preferably 20° C. to 150° C., further preferably 40° C. to 120° C., and most preferably 60° C. to 100° C.

The flow velocity is advantageously 0.1 mL/hour to 300 L/hour, preferably 0.2 mL/hour to 30 L/hour, further preferably 0.5 mL/hour to 15 L/hour, and particularly preferably 1.0 mL/hour to 6 L/hour.

In the present invention, as the synthesis method of a quinacridone-series pigment which can be applied to a microreactor, various methods can be used, and any one of the processes can be applied. As the method of producing a quinacridone pigment according to the present invention, two reaction schemes are illustrated below as preferred examples. A quinacridone-series pigment can be produced in an apparatus having a channel whose equivalent diameter is preferably 10 mm or less, more preferably 1 mm or less.

A method of synthesizing a quinacridone compound by oxidizing reaction of 6,13-dihydroquinacridone (Scheme 1) is preferably a method using air or oxygen (see processes described in JP-A-11-209641 and JP-A-2001-115052, as reaction examples for reference), or a method using hydrogen peroxide (see a process described in JP-A-2000-226530, as a reaction example for reference), from the viewpoint of load to the environment.

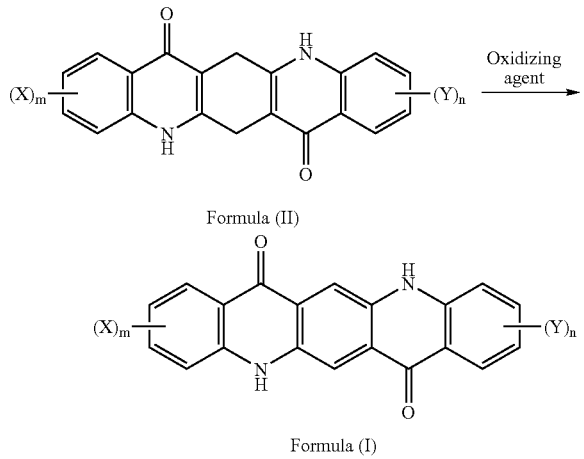

<Scheme 1>

Formula (II)

Formula (I)

In Scheme 1, X, Y, m and n have the same meanings as those described above.

A ring-closing reaction of a diarylaminoterephthalic acid or an ester thereof (Scheme 2) is carried out by use of an appropriate condensing agent (see methods described in JP-A-2001-335577 and JP-A-2000-103980, as reaction examples for reference).

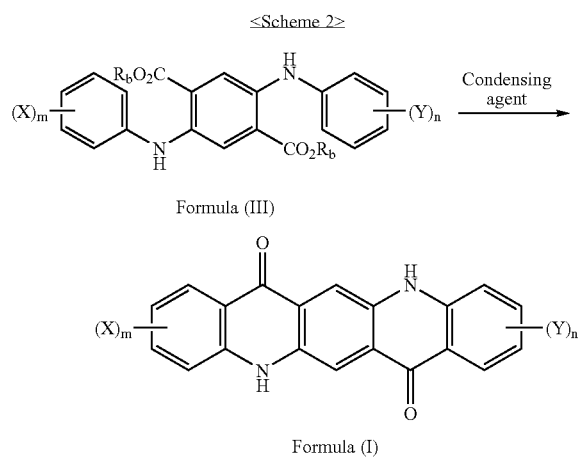

In Scheme 2, X, Y, m and n have the same meanings as those described above. The substituent $R_b$ represents a hydrogen atom, an alkyl, alkenyl or alkynyl group having 1 to 10 carbon atoms, or an aryl group having 6 to 10 carbon atoms. Examples of the alkyl group include methyl, ethyl, propyl, and butyl groups. Examples of the alkenyl group include vinyl and allyl groups. Examples of the alkenyl group include an ethynyl group. Examples of the aryl group include a phenyl group. These substituents may further have a substituent. $R_b$ is preferably an aryl group, particularly preferably a phenyl group.

The following describes a method of producing a condensed disazo-series pigment.

The condensed disazo-series pigment can be produced in a device (e.g. a micro-reactor) having a channel with an equivalent diameter of preferably 10 mm or less, more preferably 1 mm or less. The condensed disazo-series pigment is preferably one represented by the formula (IV) or (V). $Ar_1$, $Ar_2$, $D_1$ and $D_2$, which are substituents of the compound represented by any of these formulas, are described hereinafter.

$Ar_1$ and $Ar_2$ each represent a divalent aromatic group. Specifically, $Ar_1$ and $Ar_2$ are each a divalent aromatic group having 6 to 20 carbon atoms, preferably a divalent aromatic group having 6 to 10 carbon atoms. Specific examples of the divalent aromatic group include 1, 4-phenylene, 2-chloro-5-methyl-1,4-phenylene, 2,5-dichloro-1,4-phenylene, 2,5-dimethyl-1,4-phenylene, 2-chloro-1, 4-phenylene, 2,2'-dichloro-4,4'-biphenylene, benzanilide-4, 4'-diyl, 4,4'-biphenylene, 1,4-naphthylene, and 1, 5-naphthylene. Among these, 2-chloro-5-methyl-1,4-phenylene, 2,5-dichloro-1,4-phenylene, 2,5-dimethyl-1,4-phenylene, and 1,4-phenylene are particularly preferable.

$D_1$ and $D_2$ each represent a substituent, for example, a group represented by any one of formula (a) and formula (b):

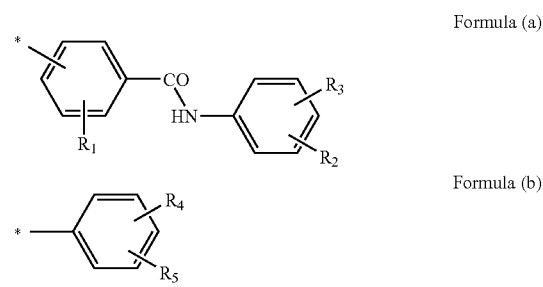

wherein, in formulas (a) and (b), a mark "*" represents a bonding site with the azo group (—N=N—) in formula (IV) or (V); $R_1$, $R_2$, and $R_3$ may be the same or different from each other, and each represent a group selected from the group consisting of a methyl group, a chlorine atom, a —$CF_3$ group, and a 4'-chlorophenoxy group; $R_4$ and $R_5$ may be the same or different from each other, and each represent a group selected from the group consisting of a chlorine atom, a methyl group, a —$CF_3$ group, a —$CO_2CH_2CH_2Cl$ group, a —$COOR_c$ group (in which $R_c$ represents an alkyl group having 1 to 4 carbon atoms), and a nitro group.

$D_1$ is preferably a group represented by formula (b); and $D_2$ is preferably a group represented by formula (a).

Particularly preferred specific examples of the condensed disazo-series pigment to be synthesized, include C.I. Pigment Yellow Nos. 93, 94, 95, 128, and 166; C.I. Pigment Orange Nos. 31 and 55; C.I. Pigment Red Nos. 139, 140, 141, 143, 144, 166, 214, 217, 218, 220, 221, 242, 248 and 262; and C.I. Pigment Brown Nos. 23, 41 and 42.

Hereinafter, preferable examples of amide bond forming reaction of the condensed disazo-series pigment, which can be applied to a micro-reactor, in the method of the present invention, are illustrated as Schemes 3 and 4. The reaction is a condensing reaction of an aryl ester of an azocarboxylic acid and an aromatic diamine.

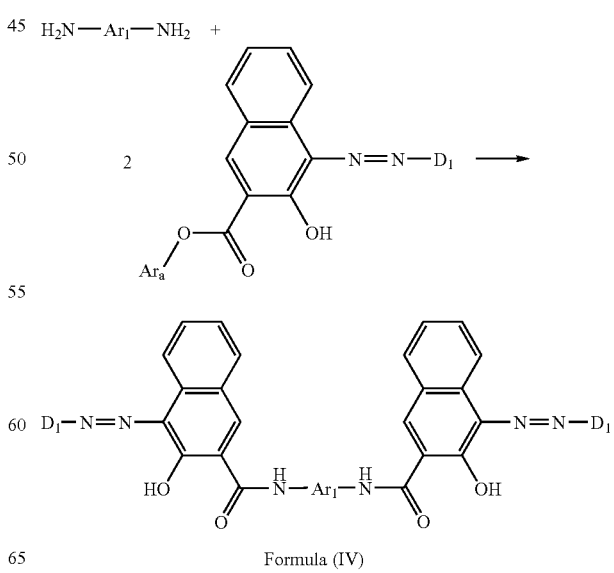

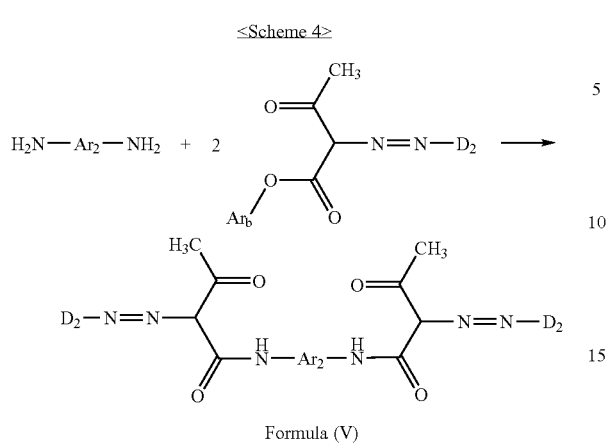
Formula (V)
In Schemes 3 and 4, $Ar_a$ and $Ar_b$ each represent a phenol derivative which is an ester component.
Specific examples of the aryl ester of the azocarboxylic acid that can be used in such a reaction, are illustrated below, but the present invention is not limited to these.
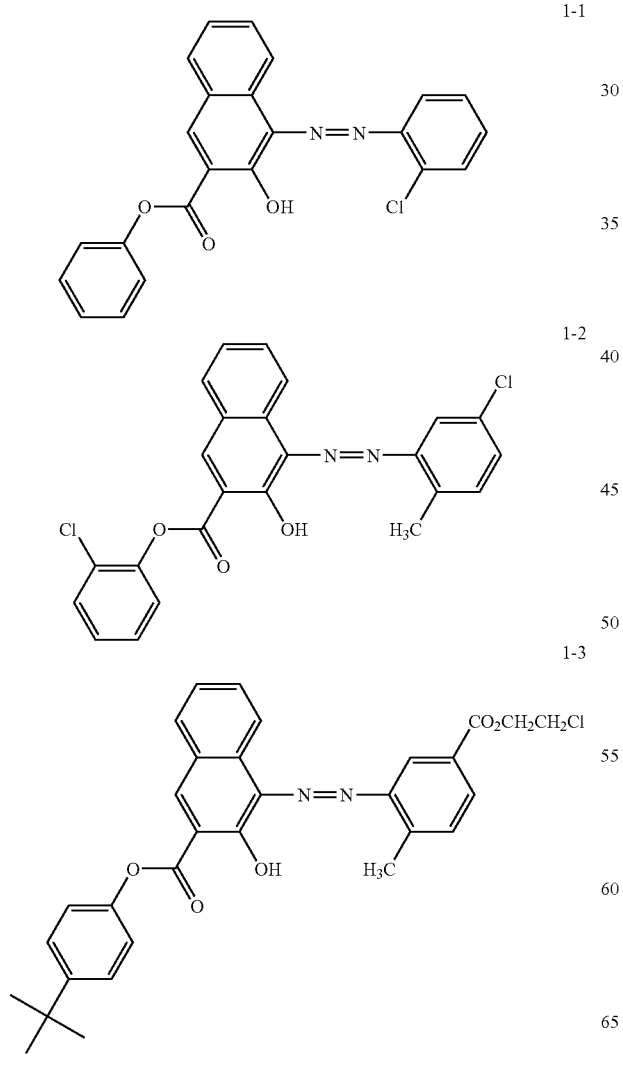
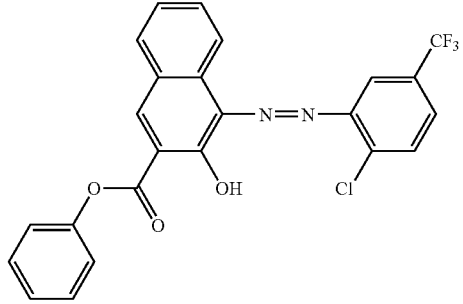
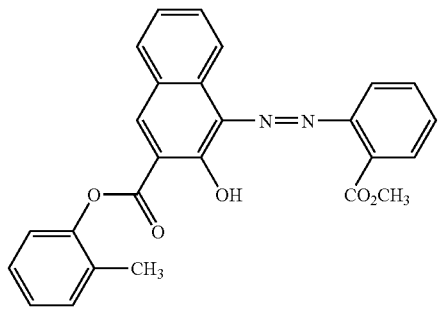
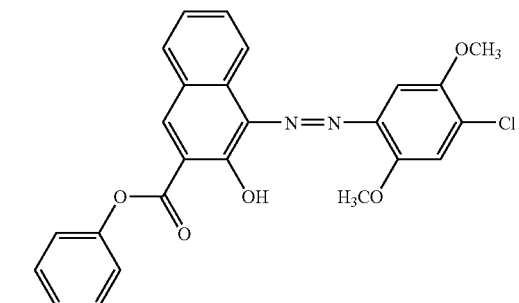
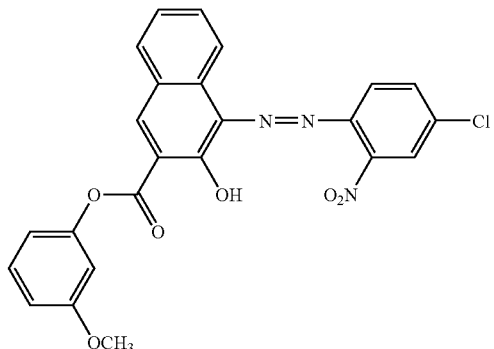
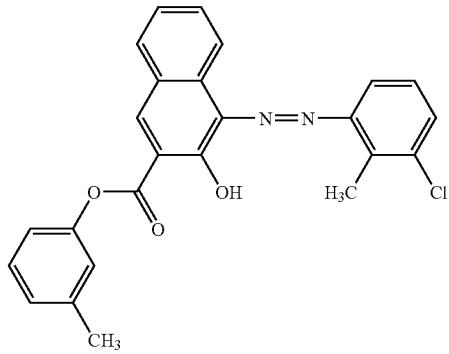

-continued
1-9
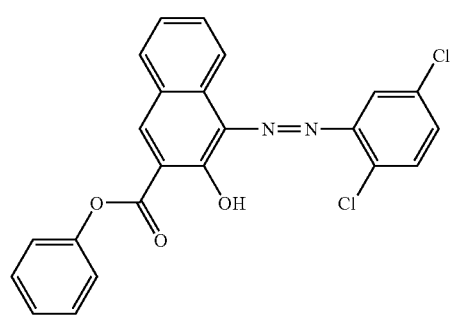
1-10
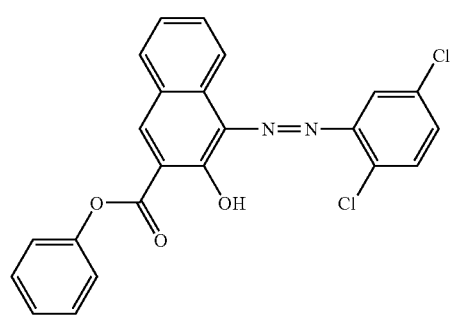
1-11
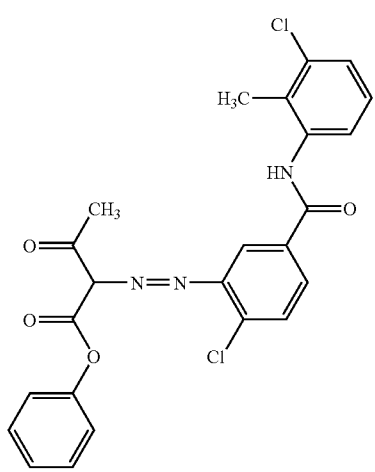
1-12
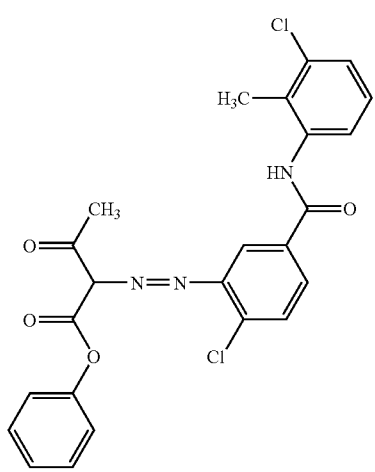
1-13
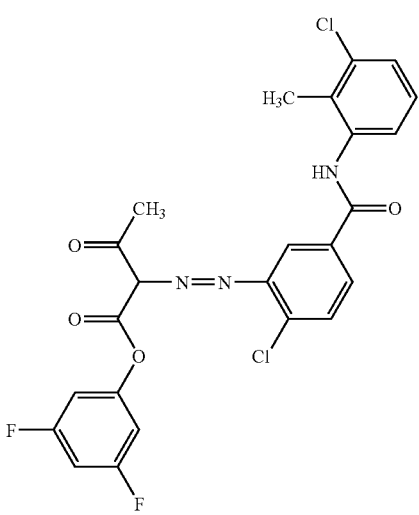
1-14
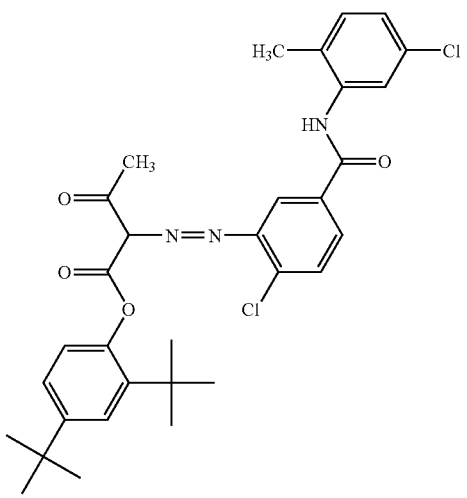
1-15
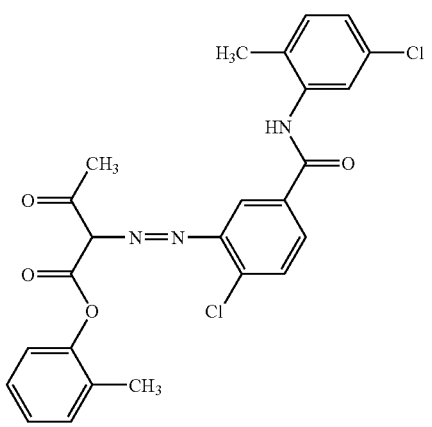

1-16
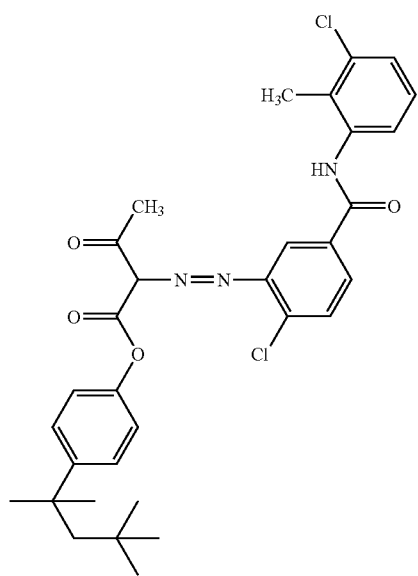
1-17
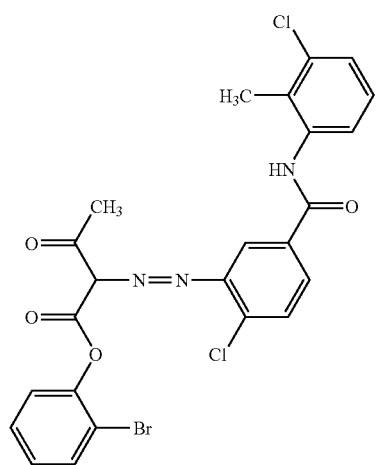
1-18
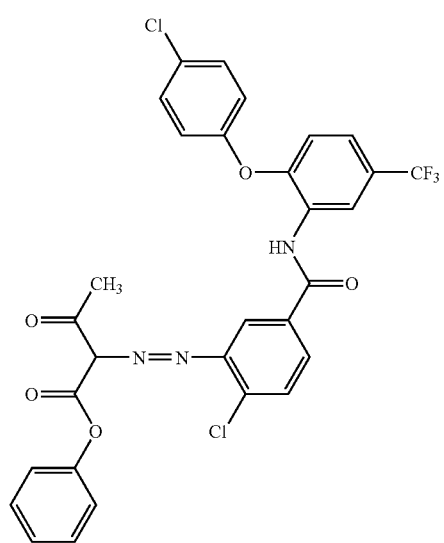
1-19
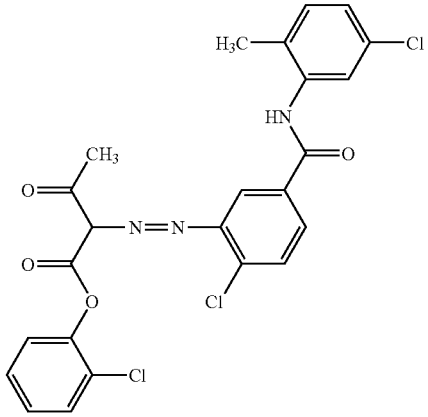
1-20
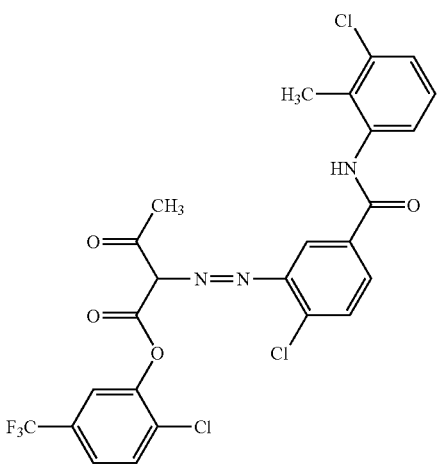
Further, specific examples of the aromatic diamine are shown below, but the present invention is not limited to these.
2-1
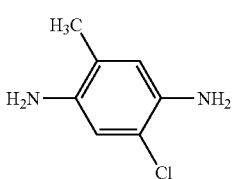
2-2
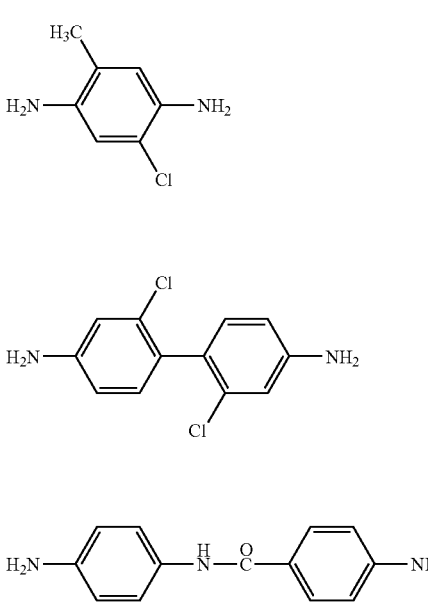
2-3
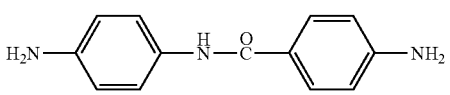

-continued 2-4
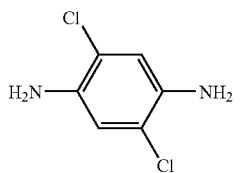

2-5
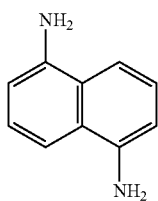

2-6
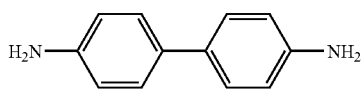

2-7
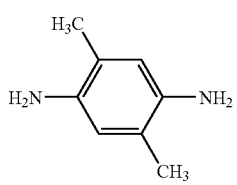

-continued 2-8
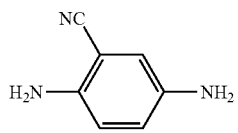

2-9
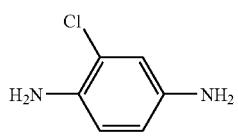

The molar ratio of the aromatic diamine to the aryl ester of azo carboxylic acid is preferably from 1:0.5 to 1:10, more preferably from 1:1 to 1:5, and particularly preferably from 1:2 to 1:4.

Further, in the case that the substituent represented by $D_2$ in the formula (V) is represented by the formula (a), the condensation of a diaryl ester of an azodicarboxylic acid and an aromatic amine, as illustrated in Scheme 5, can also be conducted.

<Scheme 5>

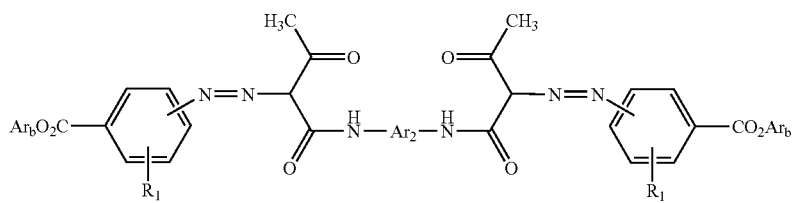

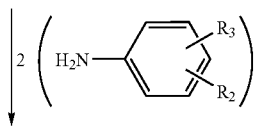

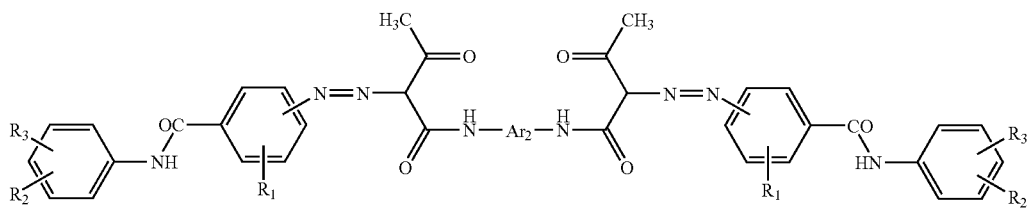

In Scheme 5, $Ar_2$, $R_1$, $R_2$, $R_3$, and $Ar_b$ have the same meanings as described in the above. Examples of $Ar_b$ include structures illustrated below. In the following exemplified structures, the symbol "*" represents a bonding site in the $Ar_b$ with the group $CO_2$—($Ar_b$) in Scheme 5.

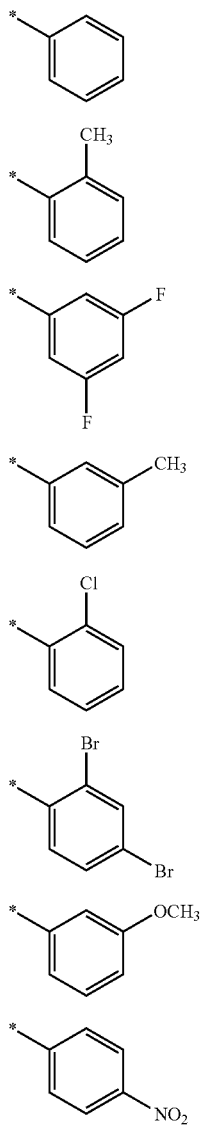

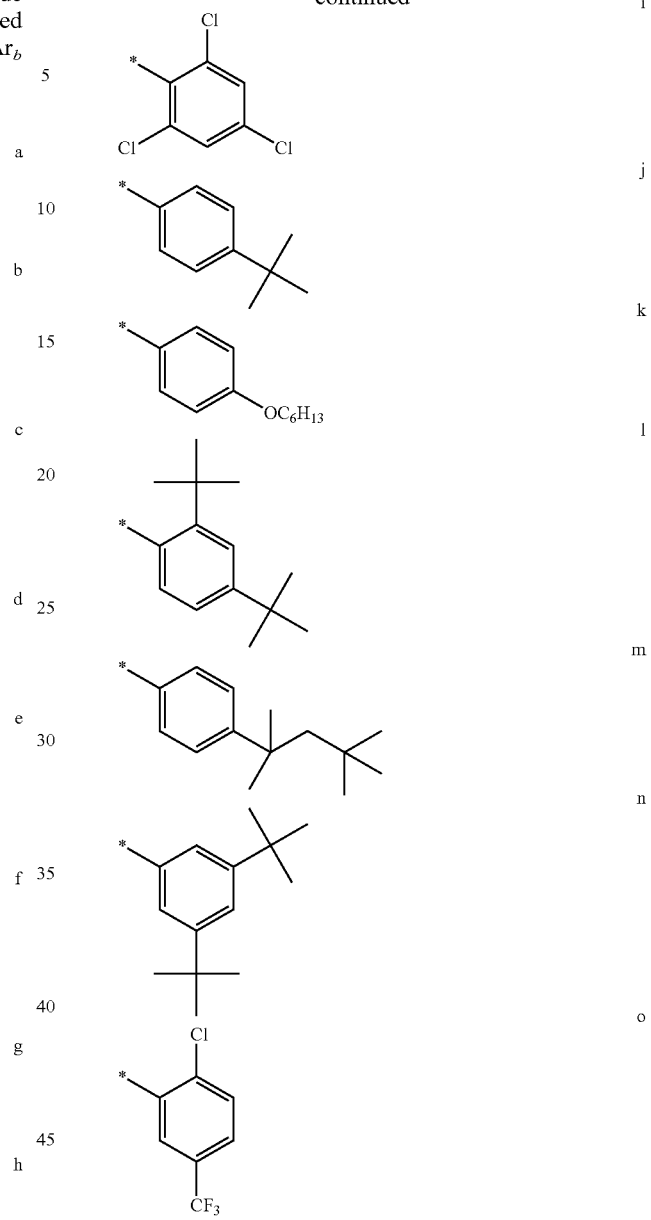

Specific examples of the diaryl ester of the azo dicarboxylic acid which can be used in such a reaction are illustrated below, but the present invention is not limited to these.

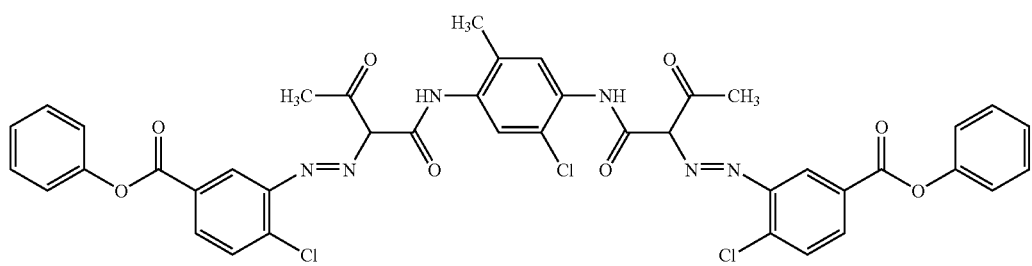

3-1

-continued
3-2
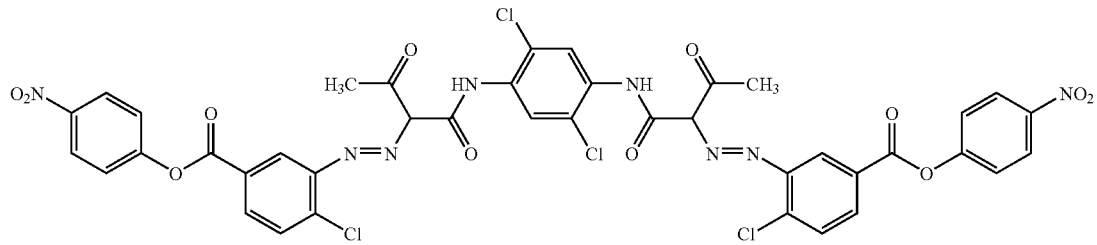
3-3
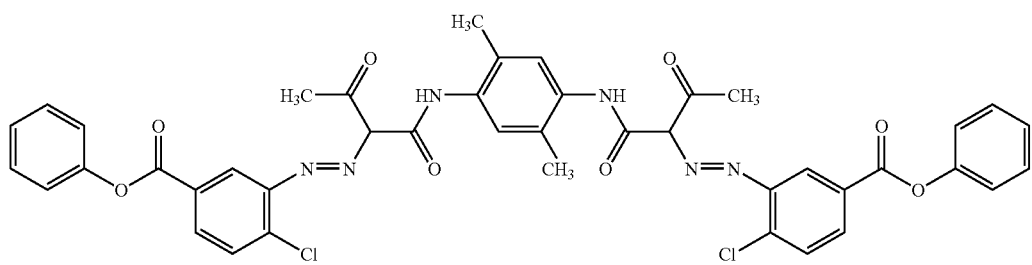
3-4
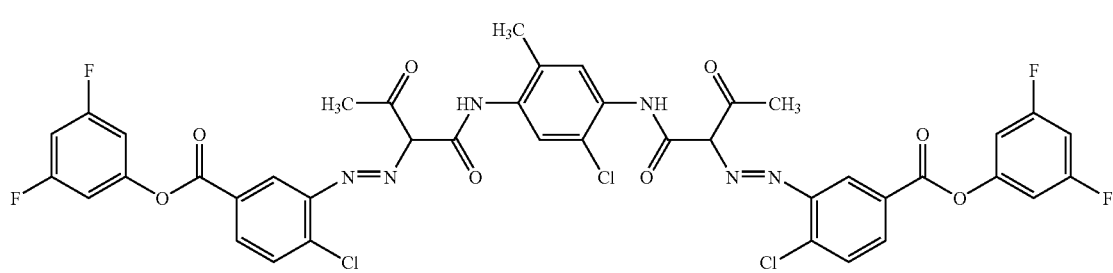
3-5
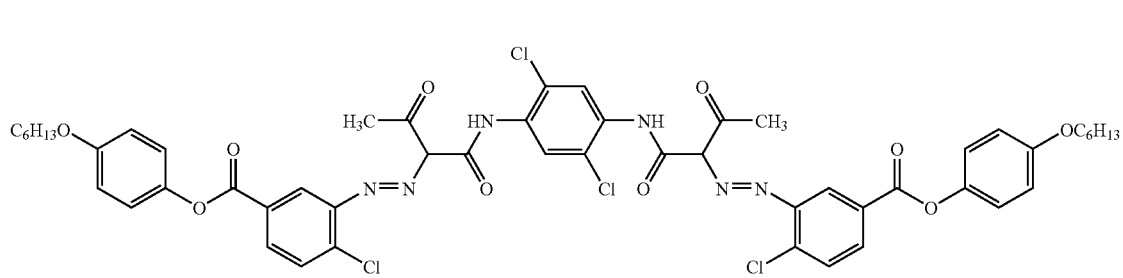
Further, specific examples of the aromatic amine are shown below, but the present invention is not limited to these.
4-1
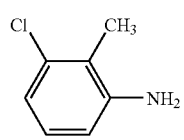
4-2
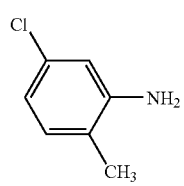
-continued
4-3
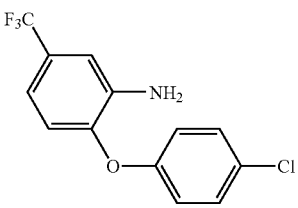
4-4
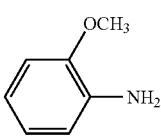

-continued

| | |
|---|---|
| 4-5 | 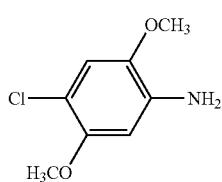 |
| 4-6 | 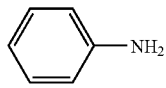 |
| 4-7 | 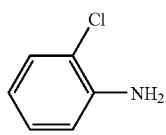 |
| 4-8 | 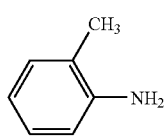 |
| 4-9 | 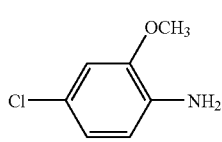 |
| 4-10 | 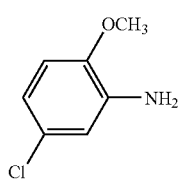 |
| 4-11 | 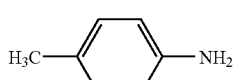 |
| 4-12 | 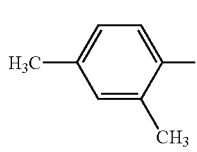 |
| 4-13 | 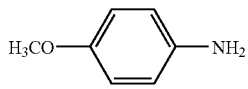 |
| 4-14 | 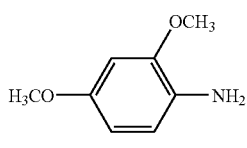 |
| 4-15 | 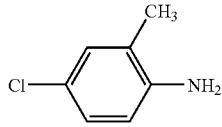 |

The molar ratio of the diaryl ester of the azo dicarboxylic acid to the aromatic amine is preferably from 1:0.5 to 1:10, more preferably from 1:1 to 1:5, and particularly preferably from 1:2 to 1:4.

The reaction temperature and the flow velocity in the reaction are the same as in the case of producing the quinacridone pigment.

Examples of the solvent, which can be used in the production of the quinacridone-series pigment and the condensed disazo-series pigment, include the above-mentioned organic solvent, dispersing agent, surfactant, or water, or the combination thereof. Specific examples thereof include ethers, such as tetrahydrofuran, dioxane, dimethoxyethane, and diglyme; esters, such as ethyl acetate, and butyl acetate; ketones, such as methyl ethyl ketone, 2-methyl-4-pentanone, and cyclohexanone; alcohols, such as ethanol, ethylene glycol, and diethylene glycol; nitrites, such as acetonitrile, and propionitrile; amide-series solvents, such as N,N-dimethylformamide, N,N-dimethylacetoamide, N-methylpyrrolidone, and N,N-dimethylimidazolidone; and sulfur-containing solvents, such as dimethylsulfoxide, and sulfolane. Among these, amide-series solvents, dimethylsulfoxide, and sulfolane are preferable from the viewpoint of the solubility of the raw materials and products. If necessary, for example, a water-soluble organic solvent which is added to an ink composition, and other components may be added to the solvent. As these solvent components, for example, constituents of pigment dispersing agents, as described in JP-A-2002-194263 and JP-A-2003-26972, can be used.

The reaction fluids may be fluids which are miscible with each other, or fluids which are immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

The quinacridone pigment or the disazo condensed pigment obtained in the reaction is separated from the reaction solution by filtration or centrifugation, and then is sufficiently washed with an amide-series solvent, such as N,N-dimethylacetoamide, thereby yielding the pigment with a high purity.

With respect to measurement of the purity of the resultant quinacridone, the quinacridone is taken out, washed and sufficiently dried, and then the purity is determined by the following method: Two milligrams of the quinacridone is precisely weighed and dissolved in 100 mL of 95% concentrated sulfuric acid at 10° C. or lower, and then the UV absorption thereof is measured. In this way, the absorption value thereof at 606 nm is determined. Then, the value is compared with the absorption value of a standard product at the same wavelength, to calculate the purity. Further, with respect to a substituted quinacridone, the absorption wavelength thereof is shifted from that of unsubstituted quinacridone. Therefore, the optimal wavelength of a standard product to the substituted quinacridone to be measured is adjusted, and then the purity of the substituted quinacridone is determined in the same manner as described above.

The purity of the produced condensed disazo-series pigment is measured by: taking out the condensed disazo-series pigment; washing it; drying it sufficiently; and comparing the absorption spectrum of a solution of the pigment dissolved, for example, in a mixed solvent of sodium hydroxide and dimethylsulfoxide, with the absorption spectrum of a standard product whose purity is known.

According to the present invention, it is possible to provide organic pigment fine-particles and a method of producing the same, which solve the problems of the conventional build-up process. Further, according to the present invention, it is possible to obtain an organic pigment of high purity in a simple manner, in the synthesis of the organic pigment, and to provide a specific method of producing the same. Further, according to the present invention, it is possible to obtain the pigment resulting from the above-mentioned reaction as organic pigment fine-particles uniform in particle diameters (e.g. monodisperse, organic pigment fine-particles), and to provide a method of producing the same.

According to the present invention, by conducting a flow reaction in a laminar flow channel, it is possible to produce a pigment and pigment fine-particles, more simply and rapidly, under mild conditions, compared with the conventional methods conducted in a flask or the like.

That is, the reaction time of a flow reaction using a laminar flow channel is controlled, and further the precision in the controlling of the reaction temperature in a narrow space is used. In this way, unpreferable side reaction(s) can be suppressed. Further, in the preparation of a pigment made into fine particles, particularly in the preparation of a pigment dispersion, use can be made of not the conventional breakdown method, in which starting materials are crushed with a mill, but the build-up method, in which particles are prepared by synthesis. The production process is based on the numbering-up of units (arrangement of a plurality of units in parallel), which is different from the conventional scaling-up of units. Therefore, the investigating time for commercialization can be remarkably reduced.

Further, in the pigment dispersion obtained by the production method of the present invention, a more precise monodispersion state can be realized. By controlling the particle diameter and the particle shape to produce the dispersion, it can be expected that the dispersion or the fine particles contained therein exhibit a new function or a higher function than that of the current products.

The present invention will be described in more detail based on examples given below, but the present invention is not limited to these examples.

EXAMPLES

The pH values described in the following examples and comparative examples were measured with a glass electrode-type hydrogen ion concentration meter, HM-40V (trade name measuring range: pH of 0 to 14) manufactured by TOA Electronics, Ltd. The particle diameter distributions were measured with a Microtrac UPA 150 manufactured by Nikkiso Co., Ltd. For TEM measurement, a transmission electron microscopy JEM-2000FX (trade name) manufactured by JEOL, Ltd. was used.

Example 1

At room temperature, 1.5 g of 2, 9-dimethylquinacridone was dissolved into 13.5 g of dimethylsulfoxide, 2.68 mL of a 5 mol/L aqueous sodium hydroxide solution, and 0.75 g of a dispersing agent, polyvinyl pyrrolidone (K30(trade name), manufactured by Wako Pure Chemicals Industries, Ltd.). The resultant solution is designated to IA solution. The pH of the IA solution was over a measurable limit (pH: 14), and was unable to be measured. Separately, 0.75 g of a dispersing agent, sodium N-oleoyl-N-methyltaurine was mixed with 90 mL of distilled water. The resultant solution is designated to as IIA solution. The pH of the IIA solution was 7.70. These solutions each were passed through a micro-filter having pores of 0.45 μm diameter (manufactured by Fuji Photo Film Co., Ltd.), to remove impurities such as dust. Then, using a reactor, as illustrated in FIG. 1-1, reaction was conducted according to the following procedure. Two Teflon (registered trademark)tubes with length 50 cm and equivalent diameter 1 mm were connected to two inlets of a Teflon (registered trademark) Y-shaped connector with equivalent diameter 500 μm, each through a connector. Two syringes in which the IA solution or the IIA solution was put, respectively, were separately connected to the front tips of the two tubes, and the reactor was fitted to a pump. A Teflon (registered trademark) tube with length 1 m and equivalent diameter 500 μm was connected to the outlet of the connector. The IA solution and the IIA solution were fed out at flow velocities of 1 mL/hour and 6 mL/hour, respectively. The inside of the channel was a laminar flow (Reynolds number: about 5.0), and a dispersion of 2,9-dimethylquinacridone was obtained. This dispersion was collected from the front tip of the tube, and is designated to as Sample 1 according to the present invention. The pH of the Sample 1 was 13.06. The mode diameter thereof was 120 nm, and the arithmetic standard deviation thereof was 58 nm.

Comparative Example 1

Separately, the IA solution was added to 6 mL of the IIA solution in a beaker, at room temperature, while stirring with a stirrer, to yield a dispersion of 2,9-dimethylquinacridone. This is designated to as Sample for comparison 1. The particle diameters and the particle diameter distributions of the particles in the thus-obtained dispersions of the Sample 1 and the Sample for comparison 1, were compared with each other, by use of the dynamic light scattering particle diameter measuring device. As a result, it was confirmed that the particle diameter and the particle diameter (size) distribution range of the particles in the dispersion of Sample 1 were much smaller than those of the particles in Sample for comparison 1, which had a mode diameter of 144 nm and an arithmetic standard deviation of 77 nm.

Example 2

At room temperature, 0.15 g of 2,9-dimethylquinacridone was dissolved into 13.35 mL of dimethylsulfoxide, 1.65 mL of a 0.8 mol/L aqueous potassium hydroxide solution, and 0.75 g of polyvinyl pyrrolidone (K30, manufactured by Wako Pure Chemicals Industries, Ltd.). The resultant solution is designated to IB solution. The pH of the IB solution was over a measurable limit, and was unable to be measured. This IB solution and the IIA solution prepared in Example 1 were separately passed through a micro-filter having pores of 0.45 μm diameter (manufactured by Fuji Photo Film Co., Ltd.), to remove impurities such as dust, thereby yielding transparent solutions, respectively. Then, using a reactor described below, reaction was conducted according to the following procedure. Two Teflon (registered trademark) tubes with length 50 cm and equivalent diameter 1 mm were connected to two inlets of a Teflon (registered trademark) Y-shaped connector with equivalent diameter 500 μm, each through a connector. Two syringes in which the IB solution or the IIA solution was put, respectively, were separately connected to the front tips of the two tubes, and the reactor was fitted to a pump. A Teflon (registered trademark) tube with length 1 m and equivalent diameter 500 μm was connected to the outlet of the connector. The IB solution and the IIA solution were fed out at flow velocities of 1.0 mL/hour and 30.0 mL/hour, respectively. The inside of the channel was a laminar flow (Reynolds number: about 21.9), and a dispersion of 2,9-dimethylquinacridone was obtained. This dispersion was collected from the front tip of the tube, and is designated to as Sample 2 according to the present invention. The pH of the Sample 2 was 10.49. This was measured by use of the dynamic light scattering particle diameter measuring device. As a result, the mode diameter of the particles in the dispersion was 51 nm, and the arithmetic standard deviation was 28 nm. Thus, it was confirmed that the distribution range of the dispersion particles was very narrow. Further, observation of the dispersion with the transmission electron microscope (TEM) showed that the particles had roundish particle shape.

Comparative Example 2

Separately, 0.5 mL of the IB solution was added to 3.0 mL of the IIA solution in a beaker, at room temperature, while stirring with a stirrer, to yield a dispersion of 2,9-dimethylquinacridone. This is designated to as Sample for comparison 2. The pH of the Sample for comparison 2 was 11.81. This was measured by use of the dynamic light scattering particle diameter measuring device. As a result, the mode diameter was 93 nm, and the arithmetic standard deviation was 57 nm. Thus, both of the particle diameter and the distribution range were conspicuously large. Further, observation of the dispersion with the transmission electron microscope (TEM) showed that the particles were in the form of needle.

Comparative Example 3

A dispersion was obtained in the same manner as in Example 2, except that all of the equivalent diameters of the Teflon (registered trademark) tubes and the Teflon (registered trademark) Y-shaped connector that were used in the reactor in Example 2 were set to 20 mm, and that the IB solution and the IIA solution were fed out at feeding flow velocities of 26.49 L/hr and 122.4 L/hr, respectively. The flow inside the channel (Reynolds number: about 2639.6) was unstable. This is designated to as Sample for comparison 3. The pH of the Sample for comparison 3 was 12.56. This was measured by use of the dynamic light scattering particle diameter measuring device. As a result, the mode diameter was 277 nm, and the arithmetic standard deviation was 140 nm. Thus, it was confirmed that the particle diameter was conspicuously large and the distribution range was conspicuously wide.

The comparison of the Sample 2 according to the present invention with the Sample for comparison 2 showed that by preparing pigment particles in the channel, the mode diameter of the particles and the distribution range thereof were made quite small and narrow, and the particle diameters thereof were made uniform. The comparison of the Sample 2 according to the present invention with the Sample for comparison 3 showed that the mode diameter of the particles was made quite small and the distribution range was made considerably narrow when the equivalent diameter of the channel was 10 mm or less, in particular, in a micro-scale.

Example 3

At room temperature, 0.01 g of 2,9-dimethylquinacridone was dissolved into 10.0 mL of dimethylsulfoxide, 0.11 mL of a 0.8N aqueous potassium hydroxide solution, and 0.05 g of polyvinyl pyrrolidone (K30, manufactured by Wako Pure Chemicals Industries, Ltd.). The resultant solution is designated to IC solution. The pH of the IC solution was over a measurable limit, and was unable to be measured. The IC solution was passed through a micro-filter having pores of 0.45 μm diameter (manufactured by Fuji Photo Film Co., Ltd.), to remove impurities such as dust, thereby yielding a transparent solution. In the reactor, as illustrated in FIG. 1-1, which had a Y-shaped channel made of glass and had a channel width A of 100 μm, a channel width B of 100 μm, a channel width C of 100 μm, a channel length F of 12 cm, and a channel depth H of 40 μm, two Teflon (registered trademark) tubes were connected to the introducing port 11 and the introducing port 12, each through a connector. Then, two syringes in which the IC solution or distilled water was put, respectively, were separately connected to the front tips of the two tubes, and the reactor was fitted to a pump. A Teflon (registered trademark) tube was connected to the discharge port 14 also through a connector. The IC solution and the distilled water were fed out at flow velocities of 20 μL/min and 20 μL/min, respectively. The inside of the channel (13) was a laminar flow (Reynolds number: about 8.5), and a dispersion of 2,9-dimethylquinacridone was obtained. This was collected from the front tip of the tube. The pH of the thus-obtained dispersion was 13.93. This was measured by use of the dynamic light scattering particle diameter measuring device. As a result, the mode diameter of the particles in the dispersion was 50 nm.

Example 4

Using the reactor, as illustrated in FIG. 2-1, which had a cylindrical channel having a channel diameter D of 200 μm, a channel diameter E of 620 μm, and a channel length G of 10 cm, two Teflon (registered trademark) tubes were connected to the introducing port 21 and the introducing port 22, each through a connector. Then, two syringes in which the IB solution or the IIA solution, as prepared in Examples 1 and 2, was put, respectively, were separately connected to the front tips of the tubes, and the reactor was fitted to a pump. The IB solution and the IIA solution were fed out at flow velocities of 1.0 mL/hour and 30.0 mL/hour, respectively. The inside of the channel was a laminar flow (Reynolds number: about 17.7), and a dispersion of 2,9-dimethylquinacridone was obtained. This was collected from the discharge port 24. The pH of the dispersion was 10.44. This was measured by use of the dynamic light scattering particle diameter measuring device. As a result, the mode diameter of the particles in the dispersion was 94 nm, and the arithmetic standard deviation was 77 nm. Thus, it was confirmed that the distribution range thereof was very narrow.

Reference Example 1

At room temperature, 0.01 g of 2,9-dimethylquinacridone was added to 10 mL of dimethylsulfoxide, 0.04 mL of a 0.8 mol/L aqueous potassium hydroxide solution, and 0.05 g of polyvinyl pyrrolidone (K30, manufactured by Wako Pure Chemicals Industries, Ltd.). The resultant liquid is designated to ID liquid. The pH of the ID liquid was 12.74. The ID liquid was suspended, but the ID liquid was used as it was, without passing through a micro-filter having pores of 0.45 μm diameter (manufactured by Fuji Photo Film Co., Ltd.). In the reactor, as illustrated in FIG. 1-1, which had a Y-shaped channel made of glass and had a channel width A of 100 μm, a channel width B of 100 μm, a channel width C of 100 μm, a channel length F of 12 cm, and a channel depth H of 40 μm, two Teflon (registered trademark) tubes were connected to the introducing port 11 and the introducing port 12, each through a connector. Then, two syringes in which the ID liquid or the IIA solution as prepared in Example 1 was put, respectively, were separately connected to the front tips of the tubes, and the reactor was fitted to a pump. A Teflon (registered trademark) tube was connected to the discharge port 14 also through a connector. The ID liquid and the IIA solution were fed out at flow velocities of 20 µL/min and 20 µL/min, respectively. As a result, at the confluent position where the ID liquid and the IIA solution were combined together, the channel was blocked. It is understood from this fact that in the method of the present invention using a reactor having a Y-shaped channel, it is important to use a homogenous solution in which the pigment is dissolved.

Reference Example 2

In the reactor, as illustrated in FIG. 2-1, which had a cylindrical channel having a channel diameter D of 200 µm, a channel diameter E of 620 µm, and a channel length G of 10 cm, two Teflon (registered trademark) tubes were connected to the introducing port 21 and the introducing port 22, each through a connector. Then, two syringes in which the ID liquid as prepared in Reference example 1 or the IIA solution as prepared in Example 1 was put, respectively, were separately connected to the front tips of the tubes, and the reactor was fitted to a pump. The ID liquid and the IIA solution were fed out at feeding flow velocities of 1.0 mL/hour and 30.0 mL/hour, respectively. As a result, at the confluent position where the ID liquid and the IIA solution were combined, the channel was gradually blocked. It is understood from this fact that in the method of the present invention using a reactor having a cylindrical channel also, it is important to use a homogenous solution in which the pigment is dissolved.

Example 5

In a reactor (30) capable of separating flows to its discharge ports, as illustrated in FIG. 3-1, which had a Y-shaped channel having a channel width I of 100 µm, a channel width J of 100 µm, a channel width K of 100 µm, a channel length L of 100 µm, a channel width M of 100 µm, a channel length Q of 2 cm, and a channel depth S of 40 µm, two Teflon (registered trademark) tubes were connected to the introducing port 31 and the introducing port 32, each through a connector. Then, two syringes in which the IB solution prepared in Example 3 or the IIA solution prepared in Example 1 was put, respectively, were separately connected to the front tips of the tubes, and the reactor was fitted to a pump. Teflon (registered trademark) tubes were connected through connectors to the discharge ports 34 and 35 also. The IB solution was fed out at a feeding flow velocity of 10 µL/min through a introducing channel 33a, and the IIA solution was fed out at a feeding flow velocity of 60 µL/min through a introducing channel 33b, respectively, to yield a dispersion layer of 2,9-dimethylquinacridone as laminar flow (Reynolds number: about 14.9) in the channel (33). In the figure, 33d is a confluent point of the flows, and 33c is a reaction channel. At a fluid separating point 33e, the dispersion layer and the other solution layer were able to be separated such that the dispersion layer would be led to the discharge port 34 through a discharging channel 33f and that the other solution layer would be led to the discharge port 35 through a discharging channel 33g.

This process made it possible to obtain the dispersion having a high concentration. The pH of the sample obtained from the discharge port 34 was 12.46, and the pH of the sample obtained from the discharge port 35 was 11.74.

Example 6

In a reactor (40) capable of separating flows to its discharge ports, as illustrated in FIG. 4, which had a cylindrical channel having a channel diameter N of 100 µm, a channel diameter P of 300 µm, a channel diameter O of 100 µm, and a channel length R of 5 cm, two Teflon (registered trademark) tubes were connected to the introducing port 41 and the introducing port 42, each through a connector. Then, two syringes in which the IC solution prepared in Example 3 or the IIA solution prepared in Example 1 was put, respectively, were separately connected to the front tips of the tubes and the reactor was fitted to a pump. Teflon (registered trademark) tubes were connected through connectors to the discharge ports 44 and 45 also. The ID solution was fed out at a feeding flow velocity of 10 µL/min through a introducing channel 43b, and the IIA solution was fed out at a feeding flow velocity of 30 µL/min through a introducing channel 43a, respectively, to yield a dispersion of 2,9-dimethylquinacridone as cylindrical laminar flow (Reynolds number: about 2.83) in the channel (a reaction channel 43c). In the figure, 43d is a confluent point of the flows. At a fluid separating point 43e, the cylindrical laminar flow containing the dispersion were able to be separated from the other solution such that the cylindrical laminar flow would be led to the discharge port 45 through a discharging channel 43f and that the other solution would be led to the discharge port 44 through a discharging channel 43g.

This process made it possible to yield the dispersion having a high concentration even if the cylindrical tube micro-reactor was used.

Comparative Example 4

Comparative example to be compared with the invention according to the above item (5)

A IE solution was obtained, by removing polyvinyl pyrrolidone (K30, manufactured by Wako Pure Chemicals Industries, Ltd.) and sodium N-oleoyl-N-methyltaurine from the IB solution in Example 2. The experiment was carried in the same manner as in Example 2, except that the IE solution instead of the IB solution, and the distilled water were fed at flow velocities of 1.0 mL/hr and 6.0 mL/hr, respectively, without changing the Teflon (registered trademark) Y-shaped connector, the Teflon (registered trademark) tubes and other members in the reactor utilized in Example 2. The thus-obtained dispersion was measured by use of the dynamic light scattering particle diameter measuring device. As a result, the mode diameter of the particles in the dispersion was 2.80 µm, and the arithmetic standard deviation was 0.89 µm. Thus, both of the particle diameter and the arithmetic standard deviation were very large. These results demonstrate that a dispersing agent is preferable in the present invention, to obtain fine particles of nanometer size.

Example 7

At room temperature, 1.0 g of Pigment Yellow 93 was dissolved into 10.0 g of dimethylsulfoxide, 1.3 mL of a 5 mol/L aqueous sodium hydroxide solution, and 0.5 g of a dispersing agent, polyvinyl pyrrolidone (K30, manufactured by Wako Pure Chemicals Industries, Ltd.). The resultant solution is designated to IF solution. Separately, 0.5 g of a dispersing agent, sodium N-oleoyl-N-methyltaurine was mixed with 60 mL of distilled water. The resultant solution is designated to as IIB solution. These solutions were separately passed through a micro-filter having pores of 0.45 µm diameter (manufactured by Fuji Photo Film Co., Ltd.), to remove impurities such as dust. Then, using a reactor described below, reaction was conducted according to the following procedure. Two Teflon (registered trademark) tubes with length 50 cm and equivalent diameter 1 mm were connected to two inlets of a Teflon (registered trademark) Y-shaped connector with equivalent diameter 500 µm, each through a connector. Two syringes in which the IF solution or the IIB solution was put, respectively, were separately connected to the front tips of the tubes, and the reactor was fitted to a pump. A Teflon (registered trademark) tube with length 1 m and equivalent diameter 500 µm was connected to the outlet through a connector. The IF solution and the IIB solution were fed out at flow velocities of 1 mL/hr and 6 mL/hr, respectively, to obtain a dispersion layer of Pigment Yellow 93 as laminar flow (Reynolds number: about 4.9) inside the channel. This was collected from the front tip of the tube, and is designated to as Sample 3 according to the present invention. In this case, the mode diameter was 133 nm, and the arithmetic standard deviation was 69 nm.

Comparative Example 5

Separately, the IF solution was added to 6 mL of the IIB solution, at room temperature, while stirring with a stirrer, to yield a dispersion of Pigment Yellow 93. This is designated to as Sample for comparison 4.

The pigment particle diameters of the Sample 3 and the Sample for comparison 4 were compared with each other, by use of the dynamic light scattering particle diameter measuring device. As a result, it was confirmed that the particle diameter and the particle diameter distribution range of the particles in the dispersion of the Sample 3 were much smaller than those of the Sample for comparison 4, which had a mode diameter of 189 nm and an arithmetic standard deviation of 98 nm.

Example 8

A pigment dispersion was obtained in the same manner as in Example 4, except that 2,9-dimethylquinacridone in the IB solution was changed to an equimolar amount of Pigment Yellow 93. The observation of the thus-obtained dispersion with the transmission electron microscope (TEM) showed that the particles in the dispersion had roundish particle shapes having an average particle diameter of 12 nm in terms of primary particles.

Example 9

A pigment dispersion was obtained in the same manner as in Example 4, except that 2,9-dimethylquinacridone in the IB solution was changed to an equimolar amount of Pigment Red 254. The observation of the thus-obtained dispersion with the transmission electron microscope (TEM) showed that the particles in the dispersion also had roundish particle shapes having an average particle diameter of 9 nm in terms of primary particles.

Example 10

At room temperature, 1.2 g of Pigment Blue 15 (manufactured by Tokyo Kasei Kogyo Co., Ltd.) was dissolved into 10 mL of 95% sulfuric acid, to prepare a IG solution. Separately, 6.0 g of polyvinyl pyrrolidone (K30, manufactured by Wako Pure Chemicals Industries, Ltd.), 6.0 g of sodium N-oleoyl-N-methyltaurine, and 240 mL of distilled water were mixed, to prepare a IIC solution. These solutions were separately passed through a micro-filter having pores of 0.45 µm diameter to remove impurities such as dust, to yield transparent solutions, respectively. A dispersion was prepared in the same manner as in Example 4, except that the IB solution used in Example 4 was changed to the IG solution, and that the IIA solution was changed to the IIC solution. The observation of the thus-obtained dispersion with the transmission electron microscope (TEM) showed that the particles in the dispersion had roundish particle shapes having an average particle diameter of 15 nm in terms of primary particles.

Example 11

Synthesis of 2,9-dimethylquinacridone by Oxidization Reaction

To 2.0 g of 2,9-dimethyl-6,13-dihydroquinacridone, were added 10.0 mL of a 5 mol/L aqueous sodium hydroxide solution, and 18 g of polyethylene glycol 400, and the resultant mixture was stirred at room temperature. The resultant solution, the color of which was deep green, is referred to as Solution A. The Solution A was fed at a flow velocity of 3.0 mL/hr by use of a syringe pump. Separately, as Solution B, a 30% by mass aqueous hydrogen peroxide solution was fed at a flow velocity of 0.5 mL/hr, by use of a syringe pump. These Solutions A and B were fed to a micro-mixer (channel width, 45 µm; depth, 200 µm) manufactured by IMM Co., and then mixed in a micro-space therein. At the discharge port of the micro-mixer, the production of a dispersion having a vivid magenta color was observed. The dispersion was analyzed, and it was proved that 2,9-dimethylquinacridone having a purity of 96% or more was produced.

Comparative Example 6

To 2.0 g of 2,9-dimethyl-6,13-dihydroquinacridone, were added 10.0 mL of a 5N aqueous sodium hydroxide solution, and 18 g of polyethylene glycol 400, and the resultant mixture was stirred at room temperature. To the resultant solution, the color of which was deep green, was dropwise added 2.0 mL of a 30% by mass aqueous hydrogen peroxide solution, and then the resultant solution was stirred at 60° C. for 1 hour, and cooled to room-temperature. The resultant was analyzed, and it was proved that the conversion ratio of the starting material was 80%, and that 2,9-dimethylquinacridone having a pigment purity of 94% or more was produced.

Example 12

Synthesis of 2,9-dimethylquinacridone by Dehydration Condensation

A solution was prepared by mixing 2.0 g of 2,5-di-(p-toluidino)-terephthalic acid, 0.1 g of p-toluenesulfonic acid, 15 mL of ethylene glycol, and 20 mL of dimethylformamide. A fused silica glass capillary (equivalent diameter, 0.20 mm; and length, 4.0 m) was provided as a reactor, and was fixed in such a manner that a portion of 2.5 m length out of the whole capillary was immersed in an oil bath. The oil bath was heated to 150° C., and this solution was fed into the reactor at a flow velocity of 1.1 mL/hr (retention time: 5 minutes) with a syringe pump. A pigment having a vivid magenta color was obtained from the discharge port of the capillary.

Comparative Example 7

A solution was prepared by mixing 2.0 g of 2,5-di-(p-toluidino)-terephthalic acid, 0.1 g of p-toluenesulfonic acid, 15 mL of ethylene glycol, and 20 mL of dimethylformamide. An oil bath was heated to 150° C. to heat the solution in a 50 mL flask. The solution was stirred for 30 minutes. The thus-produced pigment was analyzed, and it was proved that the starting materials remained slightly.

Example 13

Production of C.I. Pigment Yellow 93 by Amidation Reaction

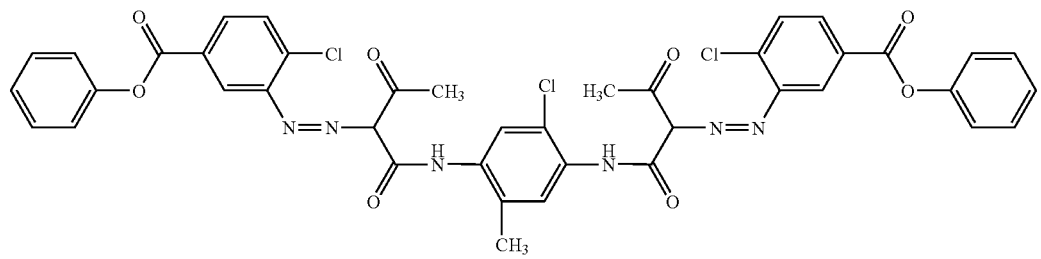

(A)

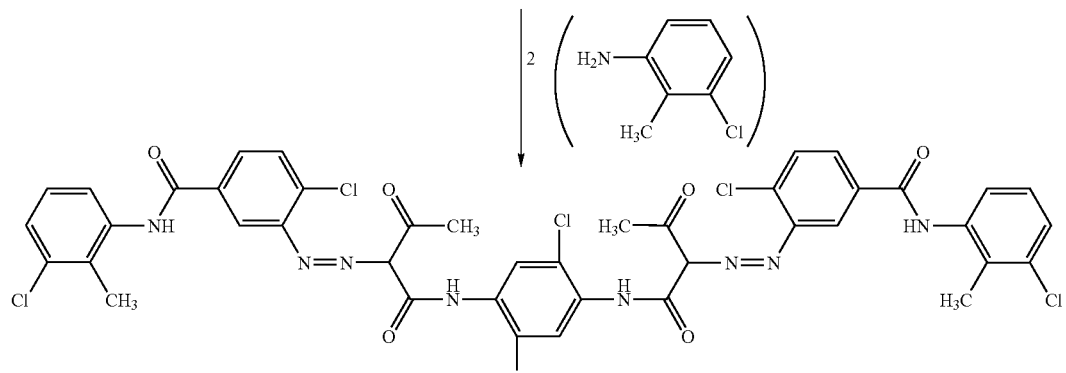

P.Y.93

Into 20 mL of dimethylformamide, were dissolved 0.3 g of the phenyl ester derivative (A) and 0.1 g of 3-chloro-2-methylanilin. A fused silica glass capillary (equivalent diameter, 0.53 mm; and length, 1.5 m) was provided as a micro-reactor, and was fixed in such a manner that a portion of 1.0 m length out of the whole capillary was immersed in an oil bath. The oil bath was heated to 150° C., and this solution was fed into the reactor at a flow velocity of 2.2 mL/hour (retention time: 6 minutes), with a syringe pump. A pigment came out from the discharge port of the capillary, had a vivid yellow color. The pigment was analyzed, and it was proved that the purity thereof was 95% or more.

Comparative Example 8

Into 20 mL of dimethylformamide, were dissolved 0.3 g of the phenyl ester derivative (A) and 0.1 g of 3-chloro-2-methylaniline. An oil bath was heated to 150° C. to heat this solution in a 50 mL flask. The solution was stirred for 1 hour. The thus-produced pigment was analyzed, and it was proved that the conversion ratio was 65%, and that the pigment had a pigment purity of 93% or less, and had a slightly dim (darkened) yellow.

Example 14

Production of C.I. Pigment Red 214 by Amidation Reaction

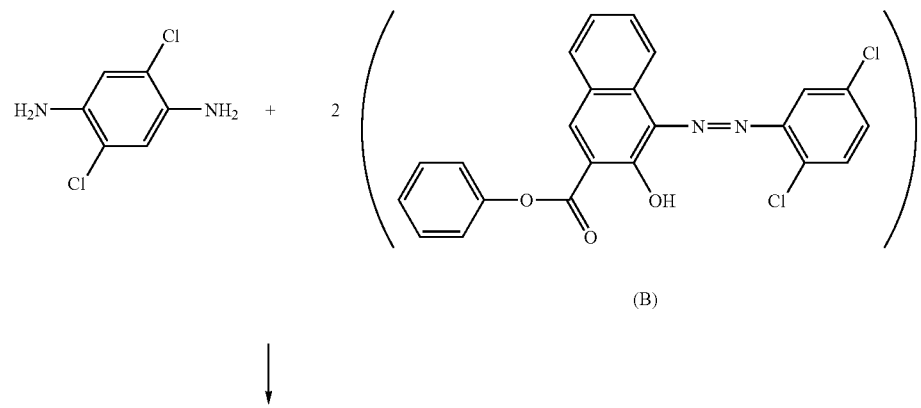

(B)

-continued

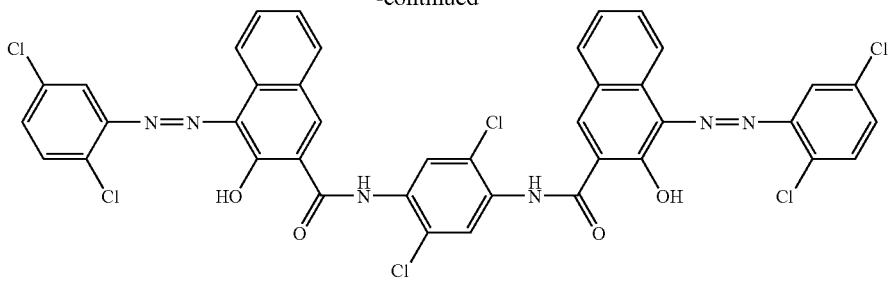

P.R.214

Into 50 mL of dimethylsulfoxide, were dissolved 1.0 g of the phenyl ester derivative (B) and 0.2 g of 2,5-dichloro-1,4-phenylenediamine. A fused silica glass capillary (equivalent diameter, 0.53 mm; length, 1.5 m) was provided as a microreactor, and was fixed in such a manner that a portion of 1.0 m length out of the whole capillary was immersed in an oil bath. The oil bath was heated to 150° C., and this solution was fed into the reactor at a flow velocity of 3.3 mL/hour (retention time: 4 minutes), with a syringe pump. A pigment came out from the discharge port of the capillary, had a vivid red color. The pigment was analyzed, and it was proved that the purity thereof was 96% or more.

Synthesis of Fine Particles of a Phthalocyanine Pigment (Pigment Blue 16)

Example 15

A dark green solution prepared into 50 mL by dissolving 2.5 g (0.45 mL) of a disodium salt of phthalocyanine (manufactured by Tokyo Kasei Kogyo Co., Ltd.) in dimethylsulfoxide (DMSO), was filtrated with a micro-filter (manufactured by Advantec Co., Ltd.), made of Teflon (PTFE) and having pores of 0.5 μm diameters. The resultant filtrate is called as a IG solution. Then, a colorless transparent solution prepared into 50 mL by dissolving 0.5 g of polyvinyl pyrrolidone (PVP, K-90™, manufactured by Wako Pure Chemicals Industries, Ltd., average molecular weight of 360,000) in DMSO, was filtrated with a micro-filter (manufactured by Advantec Co., Ltd.), made of Teflon (PTFE) and having pores of 0.5 μm diameters. The resultant filtrate is called a IH solution. Further, a colorless transparent solution prepared into 50 mL by dissolving 0.5 g (1.17 mmol) of a sodium salt of N-oleoyl-N-methyltaurine in distilled water, was filtrated with a micro-filter for aqueous solvent (manufactured by Sartorius Co.), made of a cellulose ester and having pores of 0.45 μm. The resultant filtrate is called a IID solution.

A jacket capable of circulating a coolant was fitted to a reactor having a cylindrical channel and having a channel diameter D of 100 μm, a channel diameter E of 400 μm and a channel length G of 20 cm, as illustrated in FIG. 2-1, so that the portion along the channel length G would be cooled to 5° C. Two Teflon tubes were connected to the introducing ports 21 and 22, each through a connector.

A syringe in which a mixed solution of the IG solution and the IH solution at a ratio by volume of IG:IH of 1:2 was put, was connected to the introducing port 21, and the syringe was set to a syringe pump. A syringe in which the IID was put, was connected to the introducing port 22, and the syringe was set to a syringe pump. The solutions were sent out at solution-sending speeds of 1.0 mL/hr and 10.0 mL/hr from the introducing portions 21 and 22, respectively. As a result, the flow in the channel cooled to 5° C. became a laminar flow (Reynolds number: about 9.8), and a dispersion of phthalocyanine was yielded. This dispersion was then collected from a discharge port 24. This was measured by use of a dynamic light scattering particle diameter measuring device. As a result, the mode diameter of the particles in the dispersion was 17.4 nm, and the arithmetic standard deviation thereof was 8.6 nm. Thus, the resultant dispersion had a quite small particle diameter and a very narrow distribution width.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method of producing a dispersion of a pigment, comprising:
   bringing a solution in which an organic pigment is dissolved, and an aqueous medium, into contact with each other in a channel having an equivalent diameter of 1 mm or less, and generating fine pigment particles in a liquid while it flows in the channel, wherein a liquid flow is filling the channel so as to cover a whole area of a channel cross section while flowing.

2. The method according to claim 1, wherein a Continuous flow system or a liquid plug system is employed to control the liquid flow.

3. The method according to claim 1, wherein the organic pigment solution is alkaline.

4. The method according to claim 1, wherein at least one of the organic pigment solution and the aqueous medium comprises at least one polymer dispersing agent.

5. The method according to claim 1, wherein the aqueous medium contains at least one anionic dispersing agent, and the organic pigment solution contains at least one of a non-ionic dispersing agent and a polymer dispersing agent.

6. The method according to claim 1, further comprising changing a hydrogen ion exponent (pH) of the organic pigment solution while flowing.

7. The method according to claim 1, further comprising controlling a reaction of forming the fine pigment particles by setting a time during which the channel retains the liquid flow.

8. The method according to claim 2, wherein the continuous flow system is conducted under a condition that the channel is entirely filled with liquid.

9. The method according to claim 2, wherein the liquid plug system is conducted under a condition that the liquid flow is partitioned in a droplet form and is made to move in the channel, covering a whole area of the channel cross section.

10. The method according to claim 1, wherein the channel comprises two branch channels and a single reaction channnel, each of which is connected at a confluence point, thereby forming a Y-shaped channel.

11. The method according to claim 1, wherein the channel comprises a cylindrical pipe-shaped channel inserted into a second cylindrical pipe-shaped channel.

* * * * *